(12) United States Patent
Purdy et al.

(10) Patent No.: US 7,865,522 B2
(45) Date of Patent: Jan. 4, 2011

(54) SYSTEM AND METHOD FOR HYPING MEDIA RECOMMENDATIONS IN A MEDIA RECOMMENDATION SYSTEM

(75) Inventors: Sean Purdy, Durham, NC (US); Eugene Matthew Farrelly, Cary, NC (US); Hugh Svendsen, Chapel Hill, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 246 days.

(21) Appl. No.: 11/936,562

(22) Filed: Nov. 7, 2007

(65) Prior Publication Data

US 2009/0119294 A1   May 7, 2009

(51) Int. Cl.
G06F 17/00 (2006.01)
(52) U.S. Cl. .................. 707/790; 707/791; 707/792
(58) Field of Classification Search .......... 707/790–792
See application file for complete search history.

(56) References Cited

U.S. PATENT DOCUMENTS

| | | | |
|---|---|---|---|
| 4,870,579 | A | 9/1989 | Hey |
| 5,621,456 | A | 4/1997 | Florin et al. |
| 5,771,778 | A * | 6/1998 | MacLean, IV ............. 99/323.6 |
| 5,956,027 | A | 9/1999 | Krishnamurthy |
| 5,963,916 | A | 10/1999 | Kaplan |
| 6,134,552 | A | 10/2000 | Fritz et al. |
| 6,195,657 | B1 | 2/2001 | Rucker et al. |
| 6,266,649 | B1 | 7/2001 | Linden et al. |
| 6,314,420 | B1 | 11/2001 | Lang et al. |
| 6,317,722 | B1 | 11/2001 | Jacobi et al. |
| 6,353,823 | B1 | 3/2002 | Kumar |
| 6,388,714 | B1 | 5/2002 | Schein et al. |
| 6,438,579 | B1 | 8/2002 | Hosken |
| 6,498,955 | B1 | 12/2002 | McCarthy et al. |

(Continued)

FOREIGN PATENT DOCUMENTS

EP    1536352 A1    6/2005

(Continued)

OTHER PUBLICATIONS

Hyper-Media to Hyped-Media: tpward theoretical Foundation of Design, Use and Evaluation, N. Hari Narayanan 1997.*

(Continued)

*Primary Examiner*—Sana Al-Hashemi
(74) *Attorney, Agent, or Firm*—Withrow & Terranova, PLLC

(57) ABSTRACT

Systems and methods for allowing media recommendations to be hyped in a media recommendation system. Recommenders desiring to emphasize a particular media recommendations sent to recipients can "hype" the media recommendation. Hyping is a request for the media recommendation to be used or played sooner by the recipient that it otherwise would if the media recommendation were not hyped. Typically, hyping a media recommendation increases its priority or order of placement in a recipient's media queue, which controls the order of usage or play. The higher the placement, the sooner the media recommendation may be used or played by the recipient. A hype score may be calculated for a hyped media's recommendation to control the order of placement of hyped media recommendations in the recipient's media queue. The hype score may be a function of a hype value and a natural score as if the media recommendation were not hyped.

25 Claims, 17 Drawing Sheets

U.S. PATENT DOCUMENTS

| | | | |
|---|---|---|---|
| 6,526,411 | B1 | 2/2003 | Ward |
| 6,567,797 | B1 | 5/2003 | Schuetze et al. |
| 6,587,127 | B1 | 7/2003 | Leeke et al. |
| 6,587,850 | B2 | 7/2003 | Zhai |
| 6,615,208 | B1 | 9/2003 | Behrens et al. |
| 6,629,104 | B1 | 9/2003 | Parulski et al. |
| 6,636,836 | B1 | 10/2003 | Pyo |
| 6,654,786 | B1 | 11/2003 | Fox et al. |
| 6,662,231 | B1 | 12/2003 | Drosset et al. |
| 6,670,537 | B2 | 12/2003 | Hughes et al. |
| 6,694,482 | B1 | 2/2004 | Arellano et al. |
| 6,757,517 | B2 | 6/2004 | Chang |
| 6,757,691 | B1 | 6/2004 | Welsh et al. |
| 6,801,909 | B2 | 10/2004 | Delgado et al. |
| 6,865,565 | B2 | 3/2005 | Rainsberger et al. |
| 6,904,264 | B1 | 6/2005 | Frantz |
| 6,912,528 | B2 | 6/2005 | Homer |
| 6,941,275 | B1 | 9/2005 | Swierczek |
| 6,941,324 | B2 | 9/2005 | Plastina et al. |
| 6,947,922 | B1 | 9/2005 | Glance |
| 6,976,228 | B2 | 12/2005 | Bernhardson |
| 6,987,221 | B2 | 1/2006 | Platt |
| 6,990,453 | B2 | 1/2006 | Wang et al. |
| 7,013,301 | B2 | 3/2006 | Holm et al. |
| 7,035,871 | B2 | 4/2006 | Hunt et al. |
| 7,072,846 | B1 | 7/2006 | Robinson |
| 7,072,886 | B2 | 7/2006 | Salmenkaita et al. |
| 7,075,000 | B2 | 7/2006 | Gang et al. |
| 7,089,248 | B1 | 8/2006 | King et al. |
| 7,096,234 | B2 | 8/2006 | Plastina et al. |
| 7,120,619 | B2 | 10/2006 | Drucker et al. |
| 7,139,757 | B1 | 11/2006 | Apollonsky et al. |
| 7,177,872 | B2 | 2/2007 | Schwesig et al. |
| 7,222,187 | B2 | 5/2007 | Yeager et al. |
| 7,283,992 | B2 | 10/2007 | Liu et al. |
| 7,296,032 | B1 | 11/2007 | Beddow |
| 7,340,481 | B1 | 3/2008 | Baer et al. |
| 7,437,364 | B1 | 10/2008 | Fredricksen et al. |
| 7,463,890 | B2 | 12/2008 | Herz et al. |
| 7,496,623 | B2 | 2/2009 | Szeto et al. |
| 7,509,291 | B2 | 3/2009 | McBride et al. |
| 7,548,915 | B2 * | 6/2009 | Ramer et al. ............ 1/1 |
| 7,590,546 | B2 | 9/2009 | Chuang |
| 7,594,246 | B1 | 9/2009 | Billmaier et al. |
| 7,614,006 | B2 | 11/2009 | Molander |
| 7,680,959 | B2 | 3/2010 | Svendsen |
| 7,720,871 | B2 | 5/2010 | Rogers et al. |
| 2001/0013009 | A1 | 8/2001 | Greening et al. |
| 2001/0021914 | A1 | 9/2001 | Jacobi et al. |
| 2002/0052207 | A1 | 5/2002 | Hunzinger |
| 2002/0052873 | A1 | 5/2002 | Delgado et al. |
| 2002/0082901 | A1 | 6/2002 | Dunning et al. |
| 2002/0087382 | A1 | 7/2002 | Tiburcio |
| 2002/0103796 | A1 | 8/2002 | Hartley |
| 2002/0108112 | A1 | 8/2002 | Wallace et al. |
| 2002/0116533 | A1 | 8/2002 | Holliman et al. |
| 2002/0138836 | A1 | 9/2002 | Zimmerman |
| 2002/0165793 | A1 | 11/2002 | Brand et al. |
| 2002/0178057 | A1 | 11/2002 | Bertram et al. |
| 2003/0001907 | A1 | 1/2003 | Bergsten et al. |
| 2003/0005074 | A1 | 1/2003 | Herz et al. |
| 2003/0014407 | A1 | 1/2003 | Blatter et al. |
| 2003/0018799 | A1 | 1/2003 | Eyal |
| 2003/0046399 | A1 | 3/2003 | Boulter et al. |
| 2003/0055516 | A1 | 3/2003 | Gang et al. |
| 2003/0055657 | A1 | 3/2003 | Yoshida et al. |
| 2003/0066068 | A1 | 4/2003 | Gutta et al. |
| 2003/0069806 | A1 | 4/2003 | Konomi et al. |
| 2003/0089218 | A1 | 5/2003 | Gang et al. |
| 2003/0115167 | A1 | 6/2003 | Sharif et al. |
| 2003/0135513 | A1 | 7/2003 | Quinn et al. |
| 2003/0149581 | A1 | 8/2003 | Chaudhri et al. |
| 2003/0149612 | A1 | 8/2003 | Berghofer et al. |
| 2003/0153338 | A1 | 8/2003 | Herz et al. |
| 2003/0160770 | A1 | 8/2003 | Zimmerman |
| 2003/0191753 | A1 | 10/2003 | Hoch |
| 2003/0229537 | A1 | 12/2003 | Dunning et al. |
| 2003/0237093 | A1 | 12/2003 | Marsh |
| 2004/0003392 | A1 | 1/2004 | Trajkovic et al. |
| 2004/0034441 | A1 | 2/2004 | Eaton et al. |
| 2004/0073919 | A1 | 4/2004 | Gutta |
| 2004/0088271 | A1 | 5/2004 | Cleckler |
| 2004/0091235 | A1 | 5/2004 | Gutta |
| 2004/0107821 | A1 | 6/2004 | Alcalde et al. |
| 2004/0128286 | A1 | 7/2004 | Yasushi et al. |
| 2004/0133657 | A1 | 7/2004 | Smith et al. |
| 2004/0133908 | A1 | 7/2004 | Smith et al. |
| 2004/0133914 | A1 | 7/2004 | Smith et al. |
| 2004/0162783 | A1 | 8/2004 | Gross |
| 2004/0162830 | A1 | 8/2004 | Shirwadkar et al. |
| 2004/0181540 | A1 | 9/2004 | Jung et al. |
| 2004/0186733 | A1 | 9/2004 | Loomis et al. |
| 2004/0199527 | A1 | 10/2004 | Morain et al. |
| 2004/0215793 | A1 | 10/2004 | Ryan et al. |
| 2004/0216108 | A1 | 10/2004 | Robbin |
| 2004/0224638 | A1 | 11/2004 | Fadell et al. |
| 2004/0252604 | A1 | 12/2004 | Johnson et al. |
| 2004/0254911 | A1 | 12/2004 | Grasso et al. |
| 2004/0267604 | A1 | 12/2004 | Gross |
| 2005/0021420 | A1 | 1/2005 | Michelitsch et al. |
| 2005/0021678 | A1 | 1/2005 | Simyon et al. |
| 2005/0026559 | A1 | 2/2005 | Khedouri |
| 2005/0038819 | A1 | 2/2005 | Hicken et al. |
| 2005/0038876 | A1 | 2/2005 | Chaudhuri |
| 2005/0060264 | A1 | 3/2005 | Schrock et al. |
| 2005/0060666 | A1 | 3/2005 | Hoshino et al. |
| 2005/0065976 | A1 | 3/2005 | Holm et al. |
| 2005/0091107 | A1 | 4/2005 | Blum |
| 2005/0120053 | A1 | 6/2005 | Watson |
| 2005/0125222 | A1 | 6/2005 | Brown et al. |
| 2005/0131866 | A1 | 6/2005 | Badros |
| 2005/0154608 | A1 | 7/2005 | Paulson et al. |
| 2005/0154764 | A1 | 7/2005 | Riegler et al. |
| 2005/0154767 | A1 | 7/2005 | Sako |
| 2005/0158028 | A1 | 7/2005 | Koba |
| 2005/0166245 | A1 | 7/2005 | Shin et al. |
| 2005/0197961 | A1 | 9/2005 | Miller et al. |
| 2005/0228830 | A1 | 10/2005 | Plastina et al. |
| 2005/0246391 | A1 | 11/2005 | Gross |
| 2005/0251455 | A1 | 11/2005 | Boesen |
| 2005/0251807 | A1 | 11/2005 | Weel |
| 2005/0256756 | A1 | 11/2005 | Lam et al. |
| 2005/0256866 | A1 | 11/2005 | Lu et al. |
| 2005/0267944 | A1 | 12/2005 | Little, II |
| 2005/0278377 | A1 | 12/2005 | Mirrashidi et al. |
| 2005/0278758 | A1 | 12/2005 | Bodlaender |
| 2005/0286546 | A1 | 12/2005 | Bassoli et al. |
| 2006/0004640 | A1 | 1/2006 | Swierczek |
| 2006/0004704 | A1 | 1/2006 | Gross |
| 2006/0008256 | A1 | 1/2006 | Khedouri et al. |
| 2006/0010167 | A1 | 1/2006 | Grace et al. |
| 2006/0015378 | A1 | 1/2006 | Mirrashidi et al. |
| 2006/0020662 | A1 | 1/2006 | Robinson |
| 2006/0026048 | A1 | 2/2006 | Kolawa et al. |
| 2006/0048059 | A1 | 3/2006 | Etkin |
| 2006/0064716 | A1 | 3/2006 | Sull et al. |
| 2006/0074750 | A1 | 4/2006 | Clark et al. |
| 2006/0083119 | A1 | 4/2006 | Hayes |
| 2006/0085383 | A1 | 4/2006 | Mantle et al. |
| 2006/0100924 | A1 | 5/2006 | Tevanian, Jr. |
| 2006/0126135 | A1 | 6/2006 | Stevens et al. |
| 2006/0130120 | A1 | 6/2006 | Brandyberry et al. |
| 2006/0143236 | A1 | 6/2006 | Wu |
| 2006/0156242 | A1 | 7/2006 | Bedingfield |

| | | |
|---|---|---|
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0227673 A1 | 10/2006 | Yamashita et al. |
| 2006/0242201 A1 | 10/2006 | Cobb et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0198485 A1* | 8/2007 | Ramer et al. .................. 707/3 |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0233736 A1 | 10/2007 | Xiong et al. |
| 2007/0238427 A1 | 10/2007 | Kraft et al. |
| 2007/0239724 A1* | 10/2007 | Ramer et al. .................. 707/10 |
| 2007/0244880 A1 | 10/2007 | Martin et al. |
| 2007/0245245 A1 | 10/2007 | Blue et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0033959 A1 | 2/2008 | Jones |
| 2008/0040313 A1 | 2/2008 | Schachter |
| 2008/0046948 A1 | 2/2008 | Verosub |
| 2008/0052371 A1 | 2/2008 | Partovi et al. |
| 2008/0052630 A1 | 2/2008 | Rosenbaum |
| 2008/0059576 A1 | 3/2008 | Liu et al. |
| 2008/0091771 A1 | 4/2008 | Allen et al. |
| 2008/0120501 A1 | 5/2008 | Jannink et al. |
| 2008/0133601 A1 | 6/2008 | Cervera et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147482 A1 | 6/2008 | Messing et al. |
| 2008/0147711 A1 | 6/2008 | Spiegelman et al. |
| 2008/0189391 A1 | 8/2008 | Koberstein et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0208823 A1 | 8/2008 | Hicken |
| 2008/0228945 A1 | 9/2008 | Yoon et al. |
| 2008/0235632 A1 | 9/2008 | Holmes |
| 2008/0242221 A1 | 10/2008 | Shapiro et al. |
| 2008/0242280 A1 | 10/2008 | Shapiro et al. |
| 2008/0244681 A1 | 10/2008 | Gossweiler et al. |
| 2008/0270561 A1 | 10/2008 | Tang et al. |
| 2008/0276279 A1 | 11/2008 | Gossweiler et al. |
| 2008/0288588 A1 | 11/2008 | Andam et al. |
| 2008/0301118 A1 | 12/2008 | Chien et al. |
| 2008/0306826 A1 | 12/2008 | Kramer et al. |
| 2008/0319833 A1 | 12/2008 | Svendsen |
| 2009/0006368 A1 | 1/2009 | Mei et al. |
| 2009/0006374 A1 | 1/2009 | Kim et al. |
| 2009/0007198 A1 | 1/2009 | Lavender et al. |
| 2009/0042545 A1 | 2/2009 | Avital et al. |
| 2009/0055385 A1 | 2/2009 | Jeon et al. |
| 2009/0055467 A1 | 2/2009 | Petersen |
| 2009/0069911 A1 | 3/2009 | Stefik |
| 2009/0069912 A1 | 3/2009 | Stefik |
| 2009/0070350 A1 | 3/2009 | Wang |
| 2009/0077124 A1 | 3/2009 | Spivack et al. |
| 2009/0077220 A1 | 3/2009 | Svendsen et al. |
| 2009/0089288 A1 | 4/2009 | Petersen |
| 2009/0129671 A1 | 5/2009 | Hu et al. |
| 2010/0031366 A1 | 2/2010 | Knight et al. |

FOREIGN PATENT DOCUMENTS

| | | |
|---|---|---|
| EP | 1835455 A1 | 9/2007 |
| GB | 2372850 A | 9/2002 |
| GB | 2397205 A | 7/2004 |
| JP | 2005-321668 | 11/2005 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006075032 A1 | 7/2006 |
| WO | 2006/126135 A2 | 11/2006 |

WO 2007092053 A1 8/2007

OTHER PUBLICATIONS

"Goombah—Preview," http://www.goombah.com/preview.html, printed Jan. 8, 2008, 5 pages.
Jeff Mascia et al., "Lifetrak: Music In Tune With Your Life," copyright 2006, 11 pages.
Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story? track=tothtml, 5 pages.
Cai, Rui et al., "Scalable Music Recommendation by Search," Proc. ACM Multimedia, Augsburg, Germany, Sep. 2007, pp. 1065-1074.
Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.
Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.
Yahoo! Music downloaded archival page from www.archive.org for Jun. 20, 2005, copyright 2005 Yahoo! Inc., 14 pages.
"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.
"Identifying iPod models," http://support.apple.com/kb/HT1353, printed Feb. 24, 2010, 13 pages.
Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.
"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.
"Ringo: Social Information Filtering for Music Recommendation," http://jolomo.net/ringo.html, printed Aug. 3, 2009, 1 page.
"Tours Profile," http://mog.com/Tour, copyright 2006-2009 Mog Inc., printed Aug. 3, 2009, 11 pages.
"Babulous :: Keep it loud," http://www.babulous.com/home.jhtml, copyright 2009 Babulous, Inc., printed Mar. 26, 2009, 2 pages.
"Amazon.com: Online Shopping for Electronics, Apparel, Computers, Books, DVDs & m . . . ," http://www.amazon.com, copyright 1996-2007 Amazon.com, Inc., printed Oct. 26, 2007, 4 pages.
"Instant Messenger—AIM—Instant Message Your Online Buddies for Free—AIM," http://dashboard.aim.com/aim, copyright 2007 AOL LLC, printed Nov. 8, 2007, 6 pages.
"Apple—iPod classic," http://www.apple.com/ipodclassic/, printed Oct. 26, 2007, 1 page.
"betterPropaganda—Free MP3s and music videos.," http://www.betterpropaganda.com/, copyright 2004-2005 betterPropaganda, printed Feb. 7, 2007, 4 pages.
"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.
"Bluetooth.com—Learn," http://www.bluetooth.com/Bluetooth/Learn/, copyright 2007 Bluetooth SIG, Inc., printed Oct. 26, 2007, 1 page.
"The Classic TV Database—Your Home For Classic TV!—www.classic-tv.com," http://www.classic-tv.com, copyright The Classic TV Database—www.classic-tv.com, printed Feb. 7, 2007, 3 pages.
"Digital Tech Life >> Download of the Week," http://www.digitaltechlife.com/category/download-of-the-week/, printed Feb. 16, 2007, 9 pages.
"MP3 music download website, eMusic," http://www.emusic.com/, copyright 2007 eMusic.com Inc., printed Feb. 7, 2007, 1 page.
"GenieLab::Music Recommendation System," http://web.archive.org/web/20060813000442/http://genielab.com/, copyright 2005 GenieLab, LLC, printed Oct. 26, 2007, 1 page.
"The Daily Barometer—GenieLab.com grants music lovers' wishes," http://media.barometer.orst.edu/home/index.cfm?event=displayArticlePrinterFriendly&uSt..., copyright 2007 The Daily Barometer, printed Feb. 16, 2007, 2 pages.
"Gracenote Playlist," Revised Dec. 29, 2005, 2 pages.
"Gracenote Playlist Plus," Revised Dec. 29, 2005, 2 pages.
"Gracenote," http://www.gracenote.com, printed Feb. 7, 2007, 1 page.
"IEEE 802.11—Wikipedia, the free encyclopedia," http://en.wikipedia.org/wiki/IEEE_802.11, printed Oct. 26, 2007, 5 pages.
"iLikeTM—Home," http://www.ilike.com/, copyright 2007 iLike, printed May 17, 2007, 2 pages.
"The Internet Movie Database (IMDb)," http://www.imdb.com/, copyright 1990-2007 Internet Movie Database Inc., printed Feb. 7, 2007, 3 pages.
"Apple—iPod + iTunes," http://www.apple.com/itunes/, copyright 2007 Paramount Pictures, printed Feb. 7, 2007, 2 pages.
"Last.fm—Wikipedia, the free encyclopedia," http://en.wikipedia.org/wiki/Last.fm, printed Aug. 8, 2006, 7 pages.
"LimeWire—Wikipedia, the free encyclopedia," http://en.wikipedia.org/wiki/LimeWire, printed Aug. 8, 2006, 2 pages.
"liveplasma music, movies, search engine and discovery engine," http://www.liveplasma.com, printed May 17, 2007, 1 page.
"Loomia—Personalized Recommendations For Media, Content and Retail Sites," http://www.loomia.com/, copyright 2006-2007 Loomia Inc., printed Feb. 7, 2007, 2 pages.
"Mercora—Music Search and Internet Radio Network," http://www.mercora.com/overview.asp, copyright 2004-2006 Mercora, Inc., printed Aug. 8, 2006, 1 page.
"Mercora—Music Search and Internet Radio Network," http://www.mercora.com/v6/_front/web.jsp, printed Feb. 7, 2007, 1 page.
"Outlook Home Page—Microsoft Office Online," http://office.microsoft.com/en-us/outlook/default.aspx, copyright 2007 Microsoft Corporation, printed Nov. 8, 2007, 1 page.
"Welcome to the Musicmatch Guide," http://www.mmguide.musicmatch.com/, copyright 2001-2004 Musicmatch, Inc., printed Feb. 7, 2007, 1 page.
"Mongomusic.com—The Best Download mp3 Resources and Information. This website is for sale!," http://www.mongomusic.com/, printed May 17, 2007, 2 pages.
"Thunderbird—Reclaim your inbox," http://www.mozilla.com/en-US/thunderbird/, copyright 2005-2007 Mozilla, printed Nov. 8, 2007, 2 pages.
"Take a look at the Future of Mobile Music :: MUSIC GURU," http://www.symbian-freak.com/news/006/02/music_guru.htm, copyright 2005 Symbian freak, printed Feb. 7, 2007, 3 pages.
"Music Recommendations 1.0—MacUpdate," http://www.macupdate.com/info.php/id/19575, printed Feb. 16, 2007, 1 page.
"MusicGremlin," http://www.musicgremlin.com/StaticContent.aspx?id=3, copyright 2005, 2006, 2007 MusicGremlin, Inc., printed Oct. 26, 2007, 1 page.
"MusicIP—The Music Search Engine," http://www.musicip.com/, copyright 2006-2007 MusicIP Corporation, printed Feb. 7, 2007, 1 page.
"Digital Music News," http://www.digitalmusicnews.com/results?title=musicstrands, copyright 2003-6 Digital Music News, printed Aug. 8, 2006, 5 pages.
"Musicstrands.com Because Music is Social," copyright 2006 MusicStrands, Inc., 2 pages.
"MyStrands for Windows 0.7.3 Beta," copyright 2002-2006 ShareApple.com networks, printed Jul. 16, 2007, 3 pages.
"MyStrands for Windows Change Log," http://www.mystrands.com/mystrands/windows/changelog.vm, printed Jul. 16, 2007, 6 pages.
"MyStrands Download," http://www.mystrands.com/overview.vm, printed Feb. 7, 2007, 3 pages.
"Napster—All The Music You Want," http://www.napster.com/using_napster/all_the_music_you_want.html, copyright 2003-2006 Napster, LLC, printed Feb. 7, 2007, 2 pages.
"Try Napster free for 7 Days—Play and download music without paying per song.," http://www.napstercom/choose/index.html, copyright 2003-2007 Napster, LLC, printed Feb. 7, 2007, 1 page.
"FAQ," http://blog.pandora.com/faq/, copyright 2005-2006 Pandora Media, Inc., printed Aug. 8, 2006, 20 pages.

"Pandora Internet Radio—Find New Music, Listen to Free Web Radio," http://www.pandora.com/, copyright 2005-2007 Pandora Media, Inc., printed Feb. 7, 2007, 1 page.

"Pandora Radio—Listen to Free Internet Radio, Find New Music," http://www.pandora.com/mgp, copyright 2005-2007 Pandora Media, Inc., printed Oct. 26, 2007, 1 page.

"RYM FAQ—Rate Your Music," http://rateyourmusic.com/faq/, copyright 2000-2007 rateyourmusic.com, printed Nov. 8, 2007, 14 pages.

"Rhapsody—Full-length music, videos and more—FREE," http://www.rhapsody.com/welcome.html, copyright 2001-2007 Listen.com, printed Feb. 7, 2007, 1 page.

Badrul M. Sarwar et al., "Recommender Systems for Large-scale E-Commerce: Scalable Neighborhood Formation Using Clustering," 2002, 6 pages.

"Soundflavor," http://www.soundflavor.com/, copyright 2003-2007 Soundflavor, Inc., printed Feb. 7, 2007, 1 page.

"that canadian girl >> Blog Archive >> GenieLab," http://www.thatcanadiangirl.co.uk/blog/2005/02/22/genielab/, copyright 2007 Vero Pepperrell, printed Feb. 16, 2007, 3 pages.

"Trillian (software)—Wikipedia, the free encyclopedia," http://en.wikipedia.org/wiki/Trillian_(instant_messenger), printed Nov. 8, 2007, 11 pages.

"UpTo11.net—Music Recommendations and Search," http://www.upto11.net/, copyright 2005-2006 Upto11.net, printed Feb. 7, 2007, 1 page.

"Webjay—Playlist Community," http://www.webjay.org/, copyright 2006 Yahoo! Inc., printed Feb. 7, 2007, 5 pages.

. "Wired News:," http://www.wired.com/news/digiwoo/1,57634-0.html, copyright 2005 Lycos, Inc., printed Oct. 9, 2006, 3 pages.

"Not safe for work—Wikipedia, the free encyclopedia," http://en.wikipedia.org/wiki/Work_safe, printed Nov. 8, 2007, 2 pages.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

"Yahoo Music Jukebox—Wikipedia, the free encyclopedia," http://en.wikipedia.org/wiki/Yahoo_music_engine, printed Aug. 8, 2006, 1 page.

"LAUNCHcast Radio—Yahoo! Messenger," http://messenger.yahoo.com/launch.php, copyright 2007 Yahoo! Inc., printed Nov. 8, 2007, 1 page.

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

"YouTube—Broadcast Yourself.," http://www.youtube.com/, copyright 2007 YouTube, LLC, printed Oct. 26, 2007, 2 pages.

"Zune.net—How-To—Share Audio Files Zune to Zune," http://web.archive.org/web/20070819121705/http://www.zune.net/en-us/support/howto/z..., copyright 2007 Microsoft Corporation, printed Nov. 14, 2007, 2 pages.

"Hulu - About," www.hulu.com/about/product_tour, copyright 2010 Hulu LLC, printed Jun. 15, 2010, 2 pages.

Nilson, Martin, "id3v2.4.0-frames - ID3.org," http://www.id3_org/id3v2.4.0-frames, Nov. 1, 2000, copyright 1998-2009, printed Jun. 15, 2010, 31 pages.

"Songbird," http://getsongbird.com/, copyright 2010 Songbird, printed Jun. 15, 2010, 2 pages.

"SongReference," http://songreference.com/, copyright 2008, SongReference.com, printed Jun. 15, 2010, 1 page.

"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.

"Identifying iPod models," http://support.apple.com/kb/HT1353, printed Feb. 24, 2010, 13 pages.

Mitchell, Bradley, "Cable Speed - How Fast is Cable Modem Internet?," http://www.compnetworking.about.com/od/internetaccessbestuses/f/cablespeed.htm, printed Feb. 24, 2010, 2 pages.

"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.

"Ringo: Social Information Filtering for Music Recommendation, " http://jolomo.net/ringo.html, printed Aug. 3, 2009, 1 page.

"Tours Profile," http://mog.com/Tour, copyright 2006-2009 Mog Inc., printed Aug. 3, 2009, 11 pages.

"Babulous :: Keep it loud, " http://www.babulous.com/home.jhtml, copyright 2009 Babulous, Inc., printed Mar. 26, 2009, 2 pages.

Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story? track=tothtml, 5 pages.

Cai, Rui et al., "Scalable Music Recommendation by Search," Proc. ACM Multimedia, Augsburg, Germany, Sep., 2007, pp. 1065-1074.

Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.

Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.

Yahoo! Music downloaded archival page from www.archive.org for Jun. 20, 2005, copyright 2005 Yahoo! Inc., 14 pages.

* cited by examiner

Recipient - Subcategory Weights (42)
(Min 0 - Max 10)

Decade = WDA

1950's = 2
1960's = 4
1970's = 7
1980's = 9
1990's = 8
2000's = 5

Source = WSA

Local = 8
Subscription = 2
Buy/Download = 6

Genre = WGA

Rock = 5
Alternative = 8
Punk = 1
Regee = 6
Country = 2
Jazz = 5
Dance = 5
New Wave = 6
Metal = 7
Folk = 4
Pop = 6
R&B = 6
Soundtrack = 8

Recommenders = WRA

Sean = 5
Jennifer = 5
Mike = 10
Michael = 5
Waymen = 5
Hugh = 5
Jay = 5

Recipient - Category Weights (40)
(Min 0 - Max 10)

Decade = 7 = WD
Genre = 9 = WG
Source = 10 = WS
Recommender = 9 = WR

*FIG. 2*

| Title | Time | Artists | Album | Genre | Year | Score | Received | Recommend |
|---|---|---|---|---|---|---|---|---|
| The Suite | 3:01 | Basil Poledouris | For The Love Of Th... | Soundtrack | 1999 | | 3/15/07 1:01 PM | Self |
| I See You In A Differen... | 4:25 | Chante Moore... | For The Love Of Th... | Soundtrack | 1999 | | 3/15/07 1:00 PM | Self |
| Just One Breath | 3:18 | Mulberry Lane | For The Love Of Th... | Soundtrack | 1999 | | 3/15/07 1:00 PM | Self |
| Something So Right | 4:11 | Kami Lyle | For The Love Of Th... | Soundtrack | 1999 | | 3/15/07 1:00 PM | Self |
| Lover Man | 4:29 | Steely Dan | For The Love Of Th... | Soundtrack | 1999 | | 3/15/07 12:59 PM | Self |
| Reelin' In The Years | 4:35 | Jonny Lank | For The Love Of Th... | Soundtrack | 1999 | | 3/15/07 12:59 PM | Self |
| Paint It Black | 3:34 | Roy Orbison | For The Love Of Th... | Soundtrack | 1999 | | 3/15/07 12:59 PM | Self |
| The Only One | 3:53 | Vince Gill | For The Love Of Th... | Soundtrack | 1999 | | 3/15/07 12:58 PM | Self |
| Loving You Makes Me ... | 3:32 | Joan Osborne | For The Love Of Th... | Soundtrack | 1999 | | 3/15/07 12:57 PM | Self |
| Baby Love | 4:15 | Semisonic | For The Love Of Th... | Soundtrack | 1999 | | 3/15/07 12:57 PM | Self |
| For The Love Of the G... | 3:53 | Kim Richey | For The Love Of Th... | Soundtrack | 1999 | | 3/15/07 12:56 PM | Self |
| Come Around | 3:54 | Jennifer Day | For The Love Of Th... | Soundtrack | 1999 | | 3/15/07 12:56 PM | Self |
| The Fun Of Your Love | 3:57 | Shaggy | For The Love Of Th... | Soundtrack | 1999 | | 3/15/07 12:55 PM | Self |
| Hope | 4:04 | Lyle Lovett | For The Love Of Th... | Soundtrack | 1999 | | 3/15/07 12:55 PM | Self |
| Summer Wind | 2:55 | Van Morrison | For The Love Of Th... | Soundtrack | 1999 | | 3/15/07 12:54 PM | Self |
| Comfortably Numb [Live] | 4:44 | Van Morrison | Van Morrison At Th... | Soundtrack | 1990 | | 3/15/07 12:53 PM | Self |
| Real Real Gone | 3:42 | Van Morrison | Van Morrison At Th... | Soundtrack | 1990 | | 3/15/07 9:11 AM | Self |
| Days Like This | 3:15 | Enya | Paint The Sky With... | Soundtrack | 1995 | | 3/15/07 9:11 AM | Self |
| The Memory Of Trees | 4:19 | Enya | Paint The Sky With... | New Age | 1995 | | 3/15/07 9:08 AM | Self |
| On My Way Home | 3:38 | Enya | Paint The Sky With... | New Age | 1995 | | 3/15/07 8:50 AM | Self |
| Marble Halls | 3:55 | Enya | Paint The Sky With... | New Age | 1991 | | 3/15/07 8:49 AM | Self |

| Hype To Friend | |
|---|---|
| Friend | Value |
| Hugh | 100 |
| Mike | 98 |
| Gary | 50 |
| Scott | |
| Maura | 75 |
| Megan | 36 |
| Shane | 24 |
| Chris | 59 |
| Patty | 67 |
| Tara | |
| Brian | 45 |
| Clay | 33 |

FIG. 6

SYSTEM AND METHOD FOR HYPING MEDIA RECOMMENDATIONS IN A MEDIA RECOMMENDATION SYSTEM

FIELD OF THE INVENTION

The present invention relates to hyping media recommendations in a media recommendation system. Hyping influences the order of placement of a media recommendation in a recipient's media queue, and thus when the media recommendation may be used or played. The present invention also relates to controlling the amount of hyping applied to hyped media recommendations.

BACKGROUND OF THE INVENTION

In recent years, there has been an enormous increase in the amount of digital media available online. Services, such as Apple's iTunes® for example, enable users to legally purchase and download music. Other services, such as Yahoo!® Music Unlimited and RealNetwork's Rhapsody®, provide access to millions of songs for a monthly subscription fee. YouTube® provides users access to video media. As a result, media has become much more accessible to consumers worldwide. Due to the large amount of accessible digital media, recommendation technologies are emerging as an important enabler to assist users in identifying and navigating large databases of available media. Recommendation technologies allow peer users, also known as "recommenders," to recommend media to other peer users, also known as "recipients" or "friends." Recommendations are useful to help users identify and select media of interest for usage and/or play.

When a media recommendation is received by a recipient, the media recommendation may be placed in a recipient's playlist. The playlist is an ordered list of media used by the recipient's device to control the order of use or play of the media. For example, if a received media recommendation is to be used or played third, the media recommendation may be placed third in the playlist. In this instance, the media recommendation will be played behind the media listed first and second in the playlist. As a convenience to the recipient, placement of media recommendations in the playlist may be carried out automatically according to a scoring system. In this manner, the recipient does not have to spend substantial time manually ordering the playlist, which may contain large amounts of media. Media recommendations can automatically be placed in the recipient's playlist according to the score. The score is typically based on the recipient's preferences for media. Media more closely matching the recipient's preferences are scored higher and thus placed higher in the playlist. Media recommendations are continuously scored as they are received and placed in the playlist according to their score. Thus, the playlist can represent an ongoing ordered list of media according to the recipient's preferences.

Recommendation systems are useful for facilitating sharing of media. However, recommendation systems provide minimal interaction between recommenders and recipients. A recommender can recommend a media item to a recipient, but the recommender does not control the order of placement in the recipient's playlist. Thus, the recipient may use or play a received media recommendation much later than desired by the recommender. The recommender has no influence or control over whether a recipient experiences a media recommendation sooner rather than later. Accordingly, a need exists for a media recommendation system and method that allows a media recommendation to be prioritized over natural scoring systems and methods. This further increases the likelihood that a recipient will experience the media recommendation sooner rather than later.

SUMMARY OF THE INVENTION

Embodiments of the present invention are directed to systems and methods for allowing a media recommendation to be "hyped" in a media recommendation system. Hyping is a designation made by a recommender to increase the priority or order of placement of a media recommendation in a recipient's media queue. Recommenders may desire to emphasize certain media recommendations over others to recipients. Thus, the present invention allows a recommender to hype a media recommendation to control or influence the media recommendation being used or played sooner by a recipient than it would otherwise be if not hyped. If a media recommendation is hyped by a recommender, a hype score may be determined for the hyped media recommendation. The hype score is then used to prioritize or control the order of placement of the hyped media recommendation in the recipient's media queue and thus its order of usage or play. Because the hype score is typically higher than a natural score of the media recommendation if it were not hyped, hyped media recommendations are typically used or played sooner by the recipient.

In one embodiment, the hype score is a function of a hype value. The hype value represents the amount of hyping to be applied. The recommender controls whether a media recommendation is hyped, but the hype value controls the hype score. Thus, controlling or influencing the hype value controls or influences the hype score, which is then used to control order of placement of a hyped media recommendation in a recipient's media queue. The hype score may be determined in a number of manners and methods. The hype score may be influenced or controlled by the recommender, the recipient, or an intermediate server or control system in the media recommendation system. For example, a recommender may send a hype value along with a hyped media recommendation to a recipient. The recommender may provide a static hype value that solely controls the amount of hyping without control or influence by other devices, including the recipient or an intermediate server. The static hype value may be added to the natural score of the hyped media recommendation to arrive at the hype score.

In another example, the hype score for a hyped media recommendation may also be influenced or controlled by a server in the recommendation system. After receipt of a hyped media recommendation destined for a recipient, the server may calculate the hype score for the hyped media recommendation. The hype score may be calculated by adding a hype value to a calculated natural score of the media recommendation, as if the media recommendation were not hyped. The natural score may be based on the server's retrieval and/or knowledge of the recipient's preferences.

The hype value may also be controlled by the recipient. This may be desirable to allow the recipient to maintain a level of control over his or her media queue. Without this control, a recommender may solely control the hype value that influences the hype score. A disingenuous recommender could unduly influence the recipient's media queue if the recipient cannot control the hype value. For example, the recipient may determine a hype value such that the media recommendation will be placed at the top of the recipient's media queue when the hype value is added to the media recommendation's natural score. The hype value is added to the natural score to provide the hype score. The natural score may be a function of the recipient's preferences, which may include both media and recommender preferences. The hype value for media recommendations in the recipient's media queue may also be dynamically updated as new media recommendations are received and/or if the recipient's preferences change since both of these events could affect the hype score. As another example, a hyped media recommendation may be assigned the maximum score by the recipient in their media queue. Thus, hyped media recommendations will automatically be placed at the top of the recipient's media queue by receiving the maximum score. The order of receipt of media recommendations may be used to further prioritize between multiple media recommendations receiving the maximum score.

The hype score may also be calculated by the recipient as a function of the recipient's hyping preferences. For example, the hyping preferences may contain settings to allow a recipient to control whether hyping is allowed for recommenders. Allowance of hyping may be controlled for all recommenders equally or in a discriminatory manner based on groupings of recommenders or individual recommenders. Allowance may be based on information about the recommender, including their identity or the amount of previous media recommendation activity from the recommender, as examples. Allowance may also be based on characteristics of the recipient's media queue. For example, allowance may be based on whether the recipient's media queue already contains a number of hyped recommendations above a threshold amount or already contains media in the media queue above a threshold score. If hyping is not allowed, a hyped media recommendation sent to the recipient will still be received. However, the hyping will be disregarded. The score for the media recommendation will be calculated using the natural score as if the recommender had not designated the media recommendation as hyped. Thus, the recommended media will be played in the same order as if the media recommendation had not been designated as hyped.

If hyping is allowed, the hyping preferences also allow a recipient to control the hype value based on the recommender. The hype value can be controlled based on individual recommenders, groups of recommenders, and/or commonly among all recommenders. The hype value may be calculated using a master hype weight and/or an individual recommender hype weighting pre-defined by a recipient. The master hype weight may be an overall weighting selected for hyped media recommendations by the recipient. Accordingly, the master hype weight is applied to all allowed hyped media recommendations regardless of the identity of the recommender. The individual recommender hype weighting is a weighting applied to recommenders on an individualized basis. By pre-defining settings for the master hype weight and/or the individual recommender hype weighting, the recipient can control the extent to which the hype designation affects the hype score and thereby the order of use or play of a hyped media recommendation.

The present invention can involve any one of the aforementioned embodiments, or a combination thereof For example, the present invention may involve both the ability of a recommender or a recommendation server to influence the hype value as well as the ability of the recipient to subsequently accept, further control, and/or alter the hype value to arrive at the hype score. In this manner, the recipient can provide ultimate control over the hype value and thus the hype score even if initially influenced by a recommender or a recommendation server.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIG. 2 is a schematic diagram of recipient preferences for scoring media recommendations for determining order of placement in a recipient's media queue;

FIG. 6 illustrates an exemplary user interface for allowing a recommender to designate a static hype value for a media recommendation and placing the hyped media recommendation in a recipient's media queue as a function of a hype score, which is a function of the static hype value, according to one embodiment of the present invention;

DETAILED DESCRIPTION OF THE PREFERRED EMBODIMENTS

Figure 1:
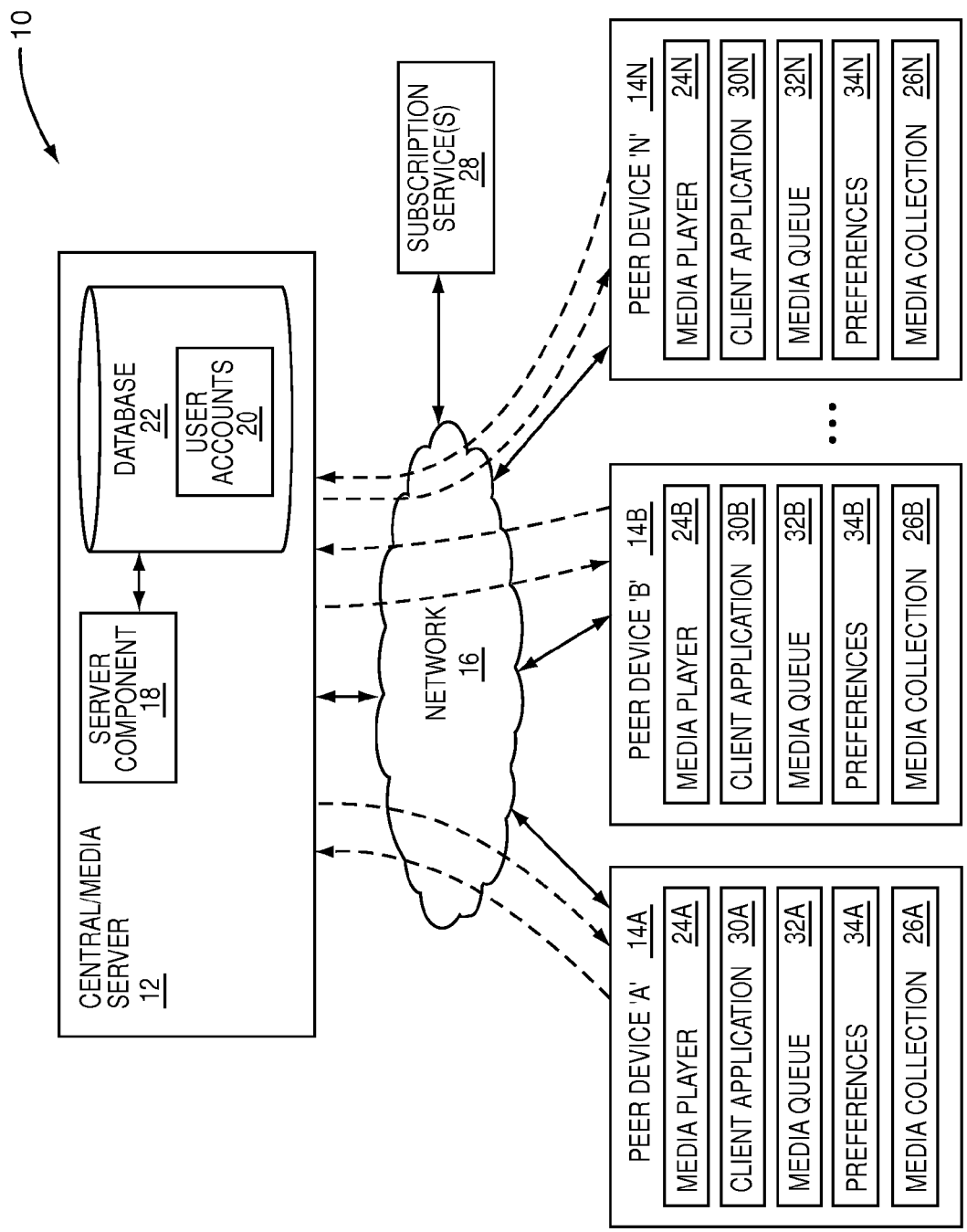
FIG. 1 illustrates a schematic diagram of an exemplary media recommendation system.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Embodiments of the present invention are directed to systems and methods for allowing a media recommendation to be "hyped" in a media recommendation system. Hyping is a designation made by a recommender to increase the priority or order of placement of a media recommendation in a recipient's media queue. Recommenders may desire to emphasize certain media recommendations over others to recipients. Thus, the present invention allows a recommender to hype a media recommendation to control or influence the media recommendation being used or played sooner by a recipient than it would otherwise be if not hyped. If a media recommendation is hyped by a recommender, a hype score may be determined for the hyped media recommendation. The hype score is then used to prioritize or control the order of placement of the hyped media recommendation in the recipient's media queue and thus its order of usage or play. Because the hype score is typically higher than a natural score of the media recommendation if it were not hyped, hyped media recommendations are typically used or played sooner by the recipient.

In one embodiment, the hype score is a function of a hype value. The hype value represents the amount of hyping to be applied. The recommender controls whether a media recommendation is hyped, but the hype value controls the hype score. Thus, controlling or influencing the hype value controls or influences the hype score, which is then used to control order of placement of a hyped media recommendation in a recipient's media queue. The hype score may be determined in a number of manners and methods. The hype score may be influenced or controlled by the recommender, the recipient, or an intermediate server or control system in the media recommendation system. For example, a recommender may send a hype value along with a hyped media recommendation to a recipient. The recommender may provide a static hype value that solely controls the amount of hyping without control or influence by other devices, including the recipient or an intermediate server. The static hype value may be added to the natural score of the hyped media recommendation to arrive at the hype score.

In another example, the hype score for a hyped media recommendation may also be influenced or controlled by a server in the recommendation system. After receipt of a hyped media recommendation destined for a recipient, the server may calculate the hype score for the hyped media recommendation. The hype score may be calculated by adding a hype value to a calculated natural score of the media recommendation, as if the media recommendation were not hyped. The natural score may be based on the server's retrieval and/or knowledge of the recipient's preferences.

The hype value may also be controlled by the recipient. This may be desirable to allow the recipient to maintain a level of control over his or her media queue. Without this control, a recommender may solely control the hype value that influences the hype score. A disingenuous recommender could unduly influence the recipient's media queue if the recipient cannot control the hype value. For example, the recipient may determine a hype value such that the media recommendation will be placed at the top of the recipient's media queue when the hype value is added to the media recommendation's natural score. The hype value is added to the natural score to provide the hype score. The natural score may be a function of the recipient's preferences, which may include both media and recommender preferences. The hype value for media recommendations in the recipient's media queue may also be dynamically updated as new media recommendations are received and/or if the recipient's preferences change since both of these events could affect the hype score. As another example, a hyped media recommendation may be assigned the maximum score by the recipient in their media queue. Thus, hyped media recommendations will automatically be placed at the top of the recipient's media queue by receiving the maximum score. The order of receipt of media recommendations may be used to further prioritize between multiple media recommendations receiving the maximum score.

The hype score may also be calculated by the recipient as a function of the recipient's hyping preferences. For example, the hyping preferences may contain settings to allow a recipient to control whether hyping is allowed for recommenders. Allowance of hyping may be controlled for all recommenders equally or in a discriminatory manner based on groupings of recommenders or individual recommenders. Allowance may be based on information about the recommender, including their identity or the amount of previous media recommendation activity from the recommender, as examples. Allowance may also be based on characteristics of the recipient's media queue. For example, allowance may be based on whether the recipient's media queue already contains a number of hyped recommendations above a threshold amount or already contains media in the media queue above a threshold score. If hyping is not allowed, a hyped media recommendation sent to the recipient will still be received. However, the hyping will be disregarded. The score for the media recommendation will be calculated as if the recommender had not designated the media recommendation as hyped. Thus, the recommended media will be played in the same order as if the media recommendation had not been designated as hyped.

Before discussing media recommendation hyping examples included in the present invention, a general discussion of a media recommendation and scoring system is discussed with respect to FIGS. 1 and 2. FIG. 1 illustrates an exemplary media recommendation system 10 to facilitate discussion of examples of hyping media recommendations. FIG. 2 illustrates an example of scoring a media recommendation without hyping to provide context for a later discussion of hyping.

As illustrated in FIG. 1, a media recommendation system 10 facilitates sharing of media between peer devices. The media recommendation system 10 may employ a media server in the form of a central server 12. The central server 12 provides media-based services and manages the flow of information to users or peer devices 14 in the media recommendation system 10. The central server 12 and the peer devices 14 can communicate with each other and with other devices over a network 16. The network 16 may be any private network or distributed public network such as, but not limited to, the Internet. This enables users to access and share media in the media recommendation system 10 and with other peer devices 14. In the example of FIG. 1, a number of peer devices are illustrated as 14A and 14B through 14N. This is to signify that any number of peer devices may be included in the media recommendation system 10.

Before a peer device 14 is able to access the media recommendation system 10, the user of the peer device 14 may be required to establish a user account with the central server 12. To establish a user account, users may direct their peer device 14 to contact the central server 12, namely a server component 18 within the central server 12. The server component 18 may be adapted to execute applications to control the media-based operations and services provided by the central server 12. The server component 18 may store user account and associated information in a record of user accounts 20 in a database 22 within or accessible to the central server 12.

The peer devices 14 may contain a media player 24 to allow a user to play media items, such as songs or video presentations, for example. The media items may be stored locally on the peer device 14 in the user's media collection 26. If the desired media item is not stored locally, the peer device 14 can access another system to obtain the desired media item. In this regard, the peer device 14 may request media items from a remote subscription service 28. The peer device 14 may also request media items from the central server 12. In order to access media-based services from the central server 12, users may be required to download a client application 30 to their peer devices 14 from the central server 12. The client application 30 provides software to allow peer devices 14 to communicate with the central server 12 to access media-based services and related information. For example, a peer device 14 may contact the central server 12, via the client application 30, to request certain media items. The central server 12 may provide the requested media item from its database 22 if present, or may access an outside service, such as the subscription service 28 for example, to access the requested media item.

The client application 30 also facilitates the peer devices 14 sending and receiving media recommendations to and from other peers in the media recommendation system 10. A user may desire to recommend a given media item to a friend. In this instance, the user, acting as a recommender, instructs their peer device 14 to send a recommendation for the desired media item to the recipient via the recipient's peer device 14. This request may be performed by the recommender manually or automatically as a result of the recommender playing a given media item. The recommender may have a pre-defined list of friends that will be sent recommendations for media items played by the recommender. In either case, the media recommendation is sent over the network 16 to the central server 12. The central server 12 intercepts the media recommendation and forwards it to the recipient's peer device 14.

The recipient's peer device 14 may place the media recommendation in a media queue 32 after the media recommendation is received. The media queue 32 contains an ordered list of media items scheduled to be played by the peer device 14. The order of placement of media items in the media queue 32 controls the order in which the media items are used or played by the recipient. The media queue 32 may be thought of as a playlist. The order of placement of the media recommendations in the media queue 32 may be controlled by a scoring algorithm. The scoring algorithm may be controlled or influenced by the recipient's preferences 34. The recipient's preferences 34 may include media-based preferences based on media attributes and/or recommender preferences, including but not limited to preferences based on the individual recommender.

An example of recipient preferences 34 that may be used to score a media recommendation is illustrated in FIG. 2. In this example, the preferences 34 are music-based preferences used for song recommendations. In this example, the media recommendation being scored is a "Buy/Download" track recommended by the user "Sean" with the genre "Soundtrack" and a release date of 1999. The score is based on weighting attributes of the media recommendation based on the recipient's preferences 34. In FIG. 2, the recipient's preferences 34 consist of category weights 40 consisting of a weighted decade of release (WD) of 7 out of 10, a weighted genre (WG) of 9 out of 10, and a weighted source (WS) of 10 out of 10. Subcategory weights 42 are provided for the decade (WDA), genre (WGA), and source (WSA), also illustrated in FIG. 2. In this example, the score for this media recommendation example is "67", as follows:

Score=(1/10)*(1/($WD+WG+WS$))*($WD*WDA+WG*WGA+WS*WSA+WR*WRA$)*100

Score=(1/10)*(1/(7+9+10+9))*(7*8+9*8+10*6+9*5)*100

Score=(1/10)*(1/35)*(56+72+60+45)*100

Score=(1/10)*(1/35)*(233)*100

Score=67

Thus, the media recommendation will be placed in the recipient's media queue 32 ahead of other media items having a score lower than "67," but behind other media items having a score higher than "67."

The interaction between recommenders and recipients for providing media recommendations may be minimal. The recommender sends a media recommendation to a recipient, but the recipient controls whether and when the recommended media item is used or played. The recipient may control when the recommended media item is used or played according to scoring algorithms and/or recipient preferences. If the recommender desires to have more control over whether and when media recommendations are used or played, the present invention allows for the recommender to "hype" the media recommendation. Hyping a media recommendation is a designation to control or influence the media recommendation's order of placement in the recipient's media queue 32. Hyping is designed to increase the likelihood that a recipient will receive and experience the media recommendation sent by a recommender sooner than would otherwise be the case if the recommendation were not hyped. For example, a recommender may desire to emphasize a particular media item to a friend. Without hyping, a media recommendation may be prioritized solely according to the recipient's desires without any influence or control by the recommender. The recommender will have no mechanism to ensure emphasis of particular media recommendations over others to the recipient.

Figure 3:
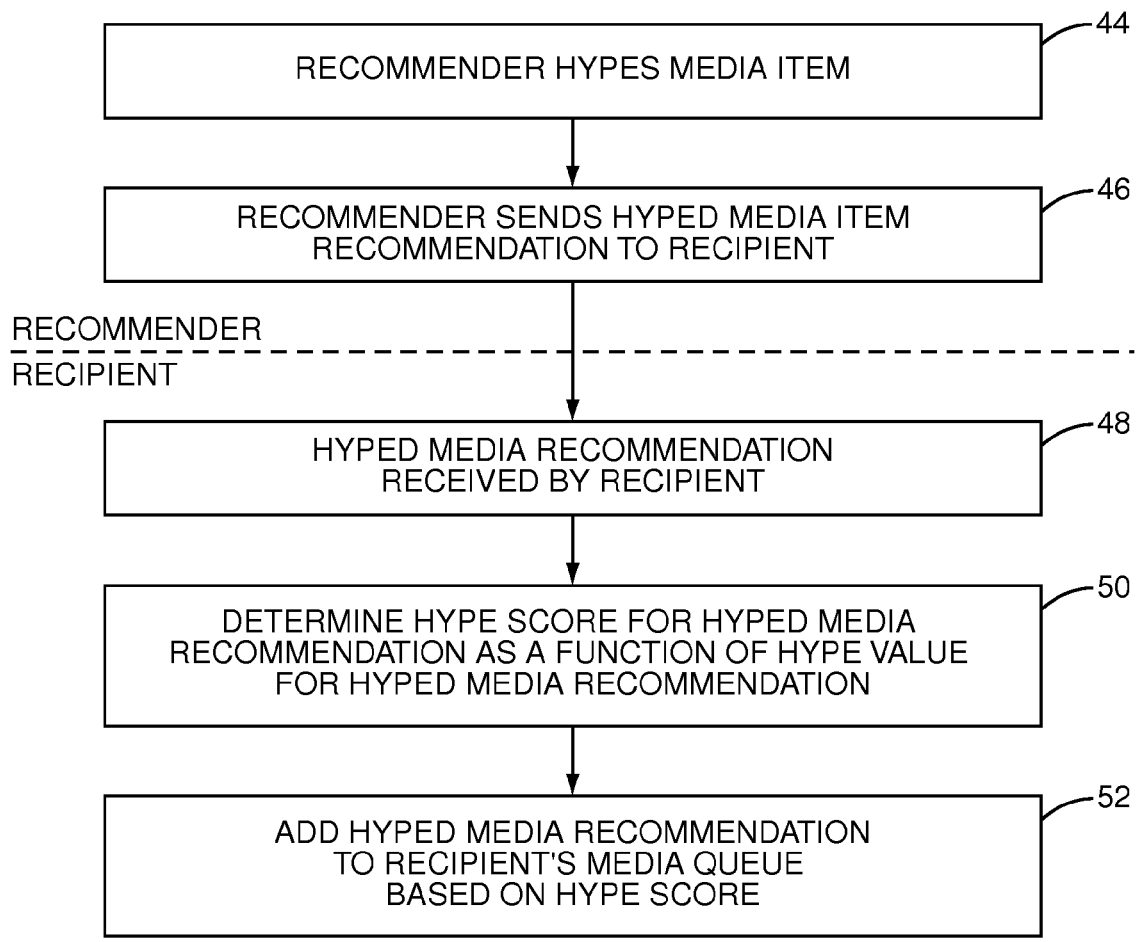
FIG. 3 is a flowchart illustrating an exemplary process for hyping a media recommendation and determining the order of placement of the hyped media recommendation in a media queue using a hype score, according to one embodiment of the present invention.
Figure 4:
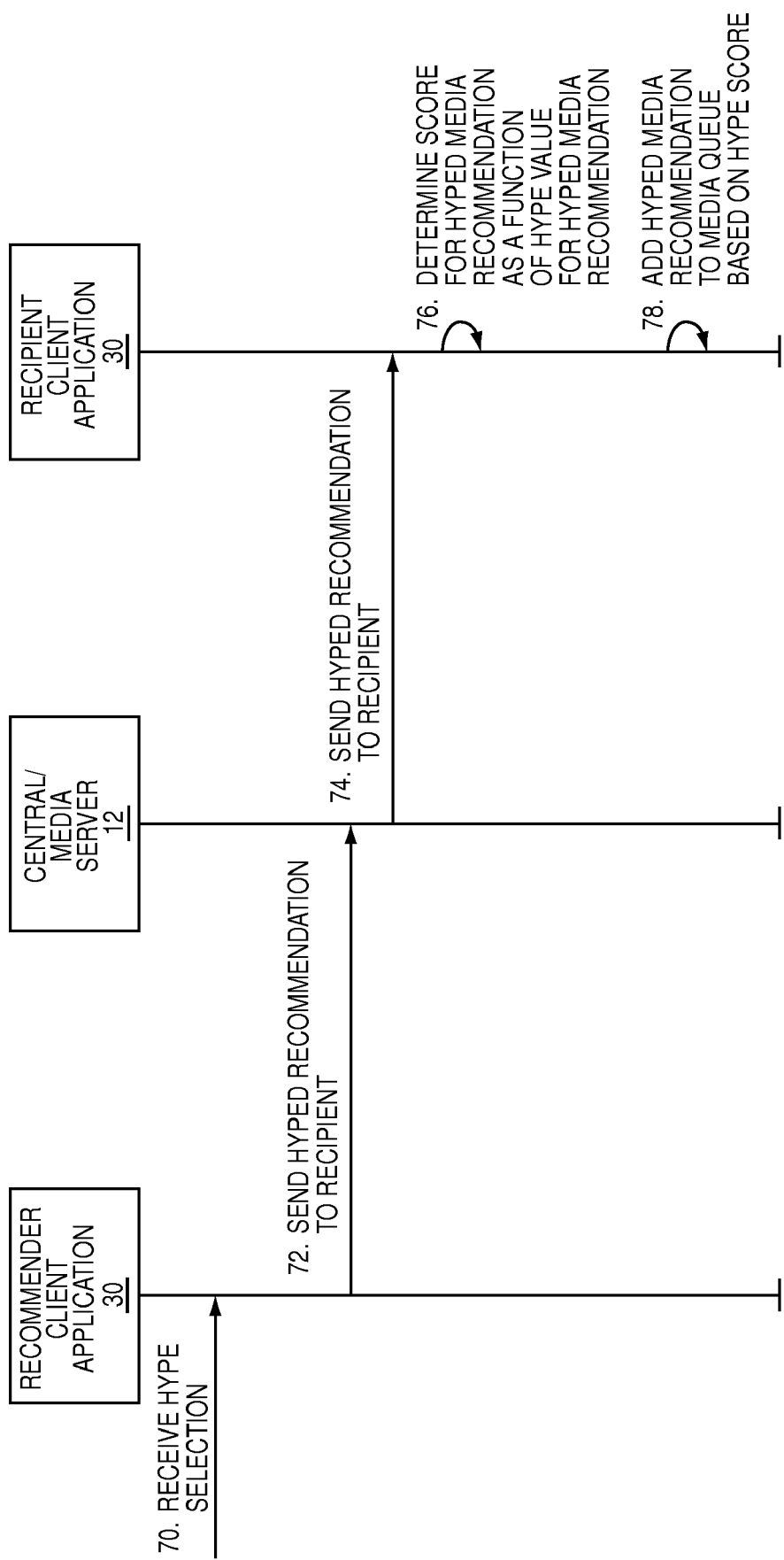
FIG. 4 is an exemplary flow diagram for communications between devices in a media recommendation system for the exemplary process in FIG. 3 for hyping a media recommendation and determining the order of placement of the hyped media recommendation in a media queue using a hype score, according to one embodiment of the present invention.

In this regard, FIG. 3 illustrates a flowchart that exemplifies the hyping of a media recommendation according to an embodiment of the present invention. FIG. 4 illustrates a flow diagram that supplements FIG. 3 and illustrates communication flow between devices in the media recommendation system 10 when a media recommendation is hyped.

Figure 5A:
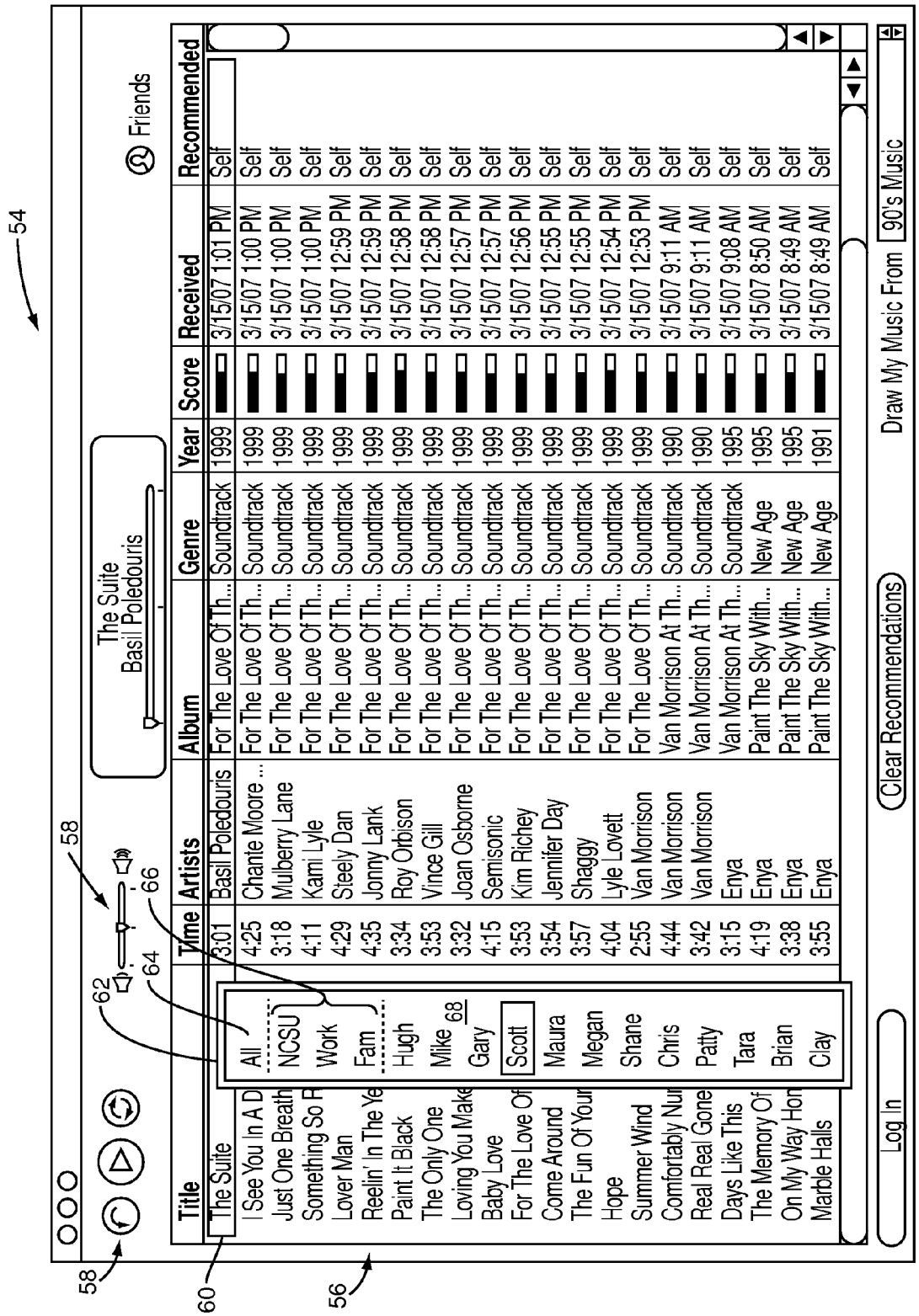
FIGS. 5A and 5B are exemplary interfaces to allow a recommender to hype a media recommendation to other peer devices.
Figure 5B:
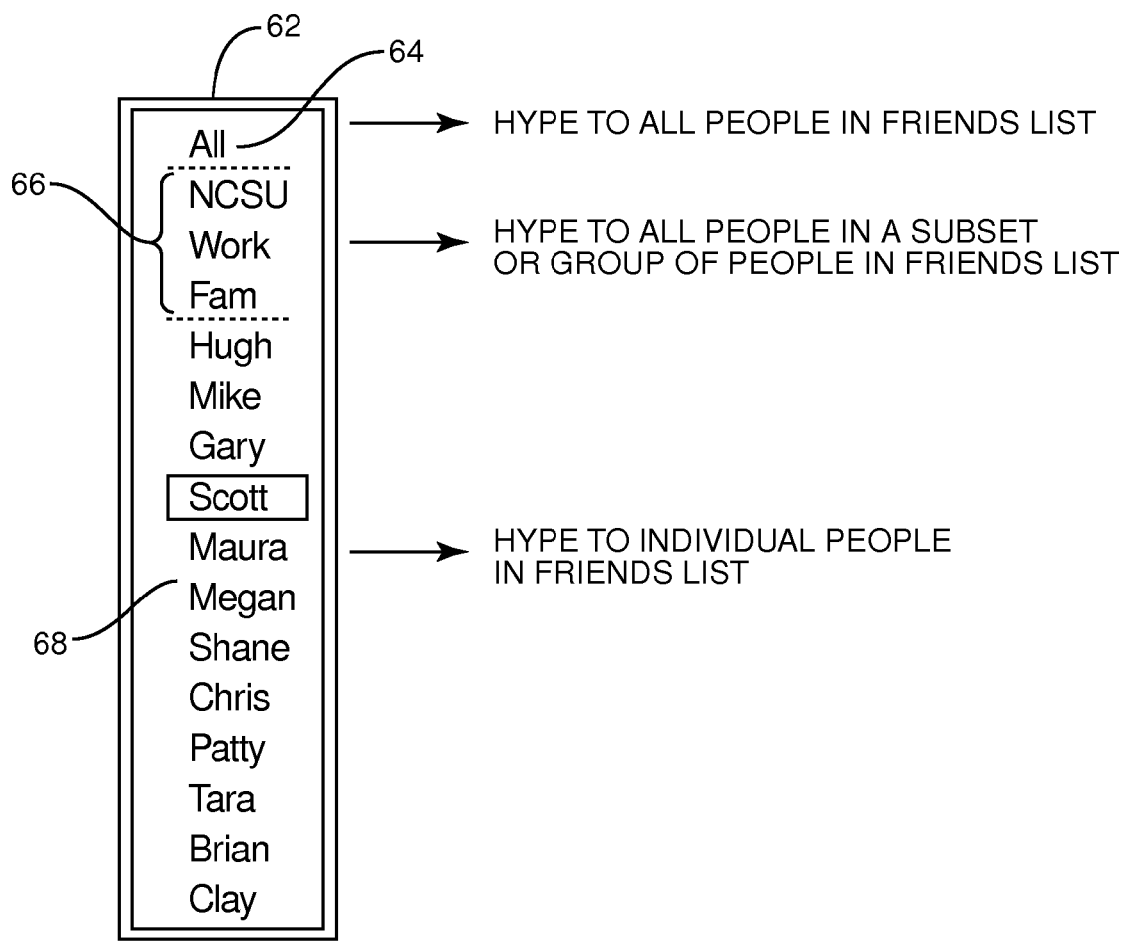

As illustrated in FIGS. 3 and 4, a recommender first hypes a media item to a recipient (step 44 in FIG. 3, step 70 in FIG. 4). The hype designation is used by the recommender to emphasize the media recommendation to the recipient. As an example, FIGS. 5A and 5B illustrate exemplary user interfaces for allowing the recommender to hype a media item according to steps 44 and 70 in FIGS. 3 and 4, respectively. The exemplary user interface is executed by the client application 30 on a recommender's peer device 14. A media player interface 54 is provided that allows a user to select and play media items 56. Typical player controls 58 may be provided to allow the recommender to control the play and volume of the selected media item 56. If the recommender wants to hype a media item, the recommender first selects the desired media item to hype 60. The recommender can then select to hype the selected media item 60, such as by right clicking a mouse button when the desired media item 60 is selected for example. A hype menu 62 may appear to give the recommender options to either hype the selected media item 60 to all friend recipients 64 in the recommender's social network, a group of friend recipients 66, or individual friend recipients 68.

Once the recommender designates a media recommendation as hyped and selects the desired recipient(s), the recommender's peer device 14 sends the hyped media recommendation to the recipient's peer device 14 (step 46 in FIG. 3, steps 72 and 74 in FIG. 4). In the example of FIG. 1, the recommender's peer device 14 would send the media recommendation destined for the recipient's peer device 14 over the network 16 to the central server 12 (step 72 in FIG. 4). The central server 12 would intercept the media recommendation and forward it to the recipient's peer device 14 (step 74 in FIG. 4).

After the hyped media recommendation is received by the recipient's peer device 14 (step 48 in FIG. 3), a hype score is determined for the hyped media recommendation (step 50 in FIG. 3, step 76 in FIG. 4). The hype score is a score that is used to determine the order of placement or priority of the media recommendation in the recipient's media queue 32. The higher the hype score, the higher the placement in the media queue 32. The higher the placement in the media queue 32, the sooner the recommended media will be used or played by the recipient's peer device 14. Once the hype score is determined (step 50 in FIG. 3, step 76 in FIG. 4), the media recommendation may be placed in the recipient peer device's media queue 32 according to the hype score (step 52 in FIG. 3, step 78 in FIG. 4).

In embodiments of the present invention, the hype score is a function of a hype value for the media recommendation. The hype value may influence, alter, or control the hype score. The hype value may be added to a natural score calculated for the media recommendation as if the media recommendation were not hyped. For example, the natural score of "67" discussed above in FIG. 2 does not include a hype value (i.e. hyping). If a media recommendation is hyped, the hype value may be added to the natural score. Thus, the hyped score would be higher than "67" in the example of FIG. 2. This in essence provides the recommender the ability to increase the priority or order of placement of the media recommendation beyond what it would have otherwise been had the media recommendation not been hyped.

It should be noted that the example of sending media recommendations via the central server 12 in FIG. 1 operates in a client-server relationship with the peer devices 14. However, the present invention may be implemented in a peer-to-peer configuration as well where media recommendations are sent directly between peer devices 14. An example of a media recommendation system that may be implemented in a user-server or peer-to-peer configuration is described in co-pending U.S. patent application Ser. No. 11/484,130, entitled "P2P Network For Providing Real Time Media Recommendations," filed Jul. 11, 2006, which is incorporated herein by reference in its entirety.

The hyping of a media item and determination of the hype score may be determined in a number of manners and methods. The hype score may be influenced or controlled by a recommender (via the recommender's peer device 14), a recipient (via the recipient's peer device 14), or the central server 12. The remainder of this description provides examples of a recommender hyping a media item and determining the hype score for the recommended media. The hype score is used to determine order of placement of the hyped media recommendation in a recipient's media queue 32.

Figure 7:
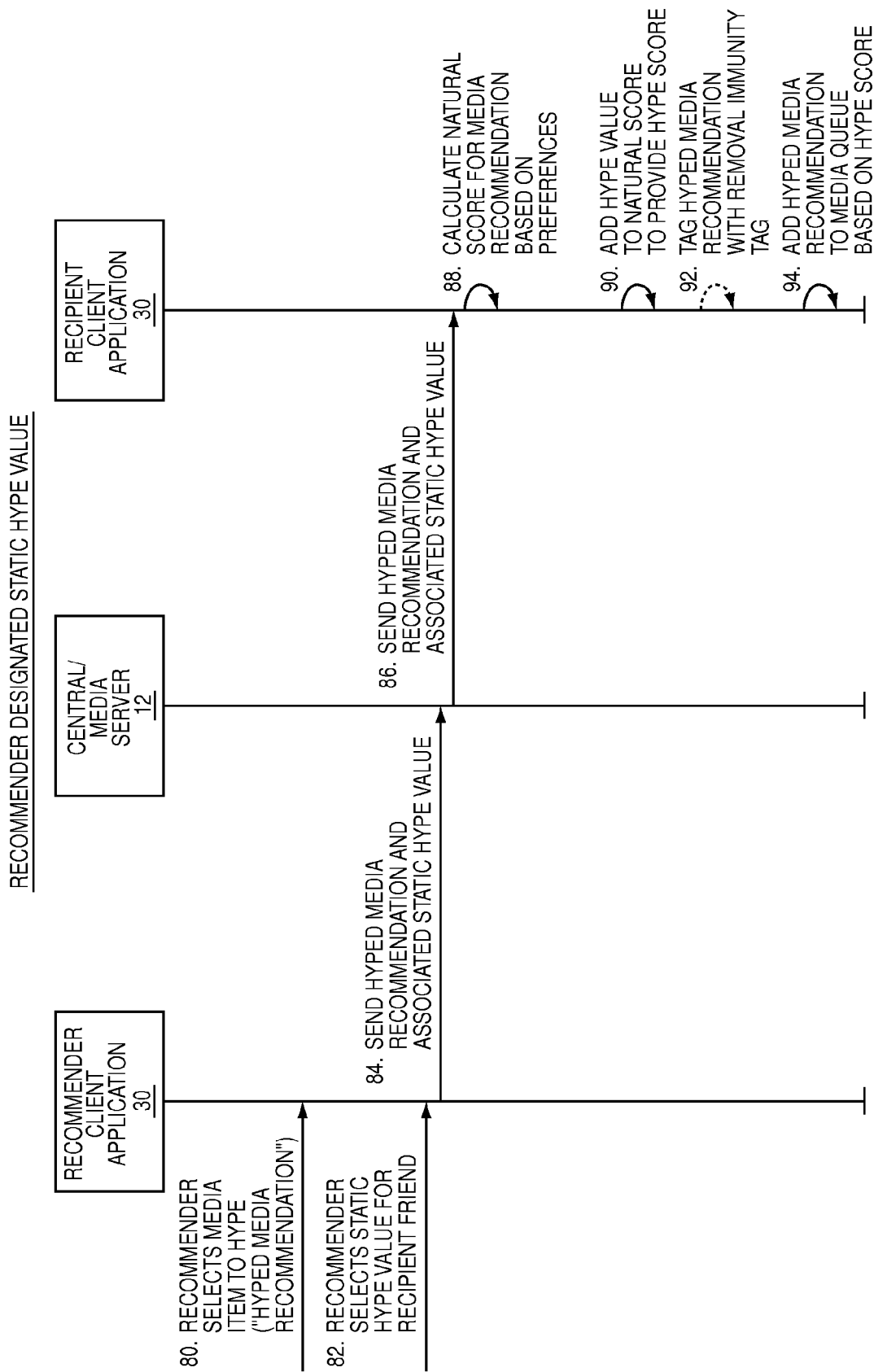
FIG. 7 illustrates an exemplary flow diagram for communications between devices in the media recommendation system for allowing a recommender to designate a static hype value for a media recommendation and placing the hyped media recommendation in a recipient's media queue as a function of a hype score, which is a function of the static hype value, according to one embodiment of the present invention.

FIGS. 6 and 7 provide a first example of providing a static hype value for a hyped media recommendation. FIG. 6 illustrates an exemplary user interface that may be executed by the client application 30 on a recommender's peer device 14 to allow a recommender to hype a media item 56. Just as illustrated in FIG. 5A, the recommender has selected a media item 60. However, in this example, the recommender desires to hype the selected media item 60. The recommender sets the hype value for the media recommendation as well. In this manner, the recommender directly influences the hyping applied to the media recommendation to control order of placement in the recipient's media queue 32.

When the recommender selects the desired media item 60 to hype (step 80 in FIG. 7), a hype interface pop-up window 70 may be generated to give the recommender the option to enter a static hype value 74 (step 82 in FIG. 7). The hype interface 70 contains a list of the recommender's social friends 72 and a previously stored hype value 74 assigned to each social friend 72. The hype interface 70 allows the recommender to provide or change a previously stored static hype value 74 for each friend 72. The static hype value 74 assigned to a friend may be added to the natural score for media recommendations sent to those friends to increase order of placement in the media queue 32. Typically, the static hype value 74 will be between a given range, for example "1-100." A default hype value may be initially set for friends, which may be in a middle part of the hype value range, for example "50." A blank or zero hype value 74 means no hyping is to be applied. If hype values are assigned, this is an inherent indication by the recommender to hype the media recommendation to the friends having assigned hype values 74. An optional button may be provided to allow a recommender to clear all hype values 74 via a "Clear All" hype value button 76. Once the desired static hype values 74 are assigned, the recommender can select the "Hype" button 78 to initiate sending the selected media item 60 as a hyped media recommendation to the friends having a static hype value 74 assigned (steps 84, 86 in FIG. 7). The static hype value 74 is also sent for the media recommendations.

Once the hyped media recommendation and associated static hype value 74 are received by the recipient's peer device 14, the recipient client application 30 calculates the hype score for the media recommendation based on the recipient's preferences 34. The hype score controls order of placement of the media recommendation in the recipient's media queue 32. The hype score may be the natural score based on the recipient's preferences (step 88 in FIG. 7) (such as that described in FIG. 2 above) added to the static hype value 74 set by the recommender (step 90 in FIG. 7). As an option, the recipient client application 30 may tag the media recommendation with a removal immunity tag. This is so the recipient does not delete the media recommendation in the media queue 32 until the media recommendation is used or played (step 92 in FIG. 7). This may be useful to prevent the recipient from accidentally deleting a media recommendation placed in the media queue 32 until used or played. Thereafter, the hyped media recommendation is added to the media queue 32 based on the hype score (step 94 in FIG. 7). The hype score determines the order of placement of the media recommendation in the recipient's media queue 32.

Figure 8:
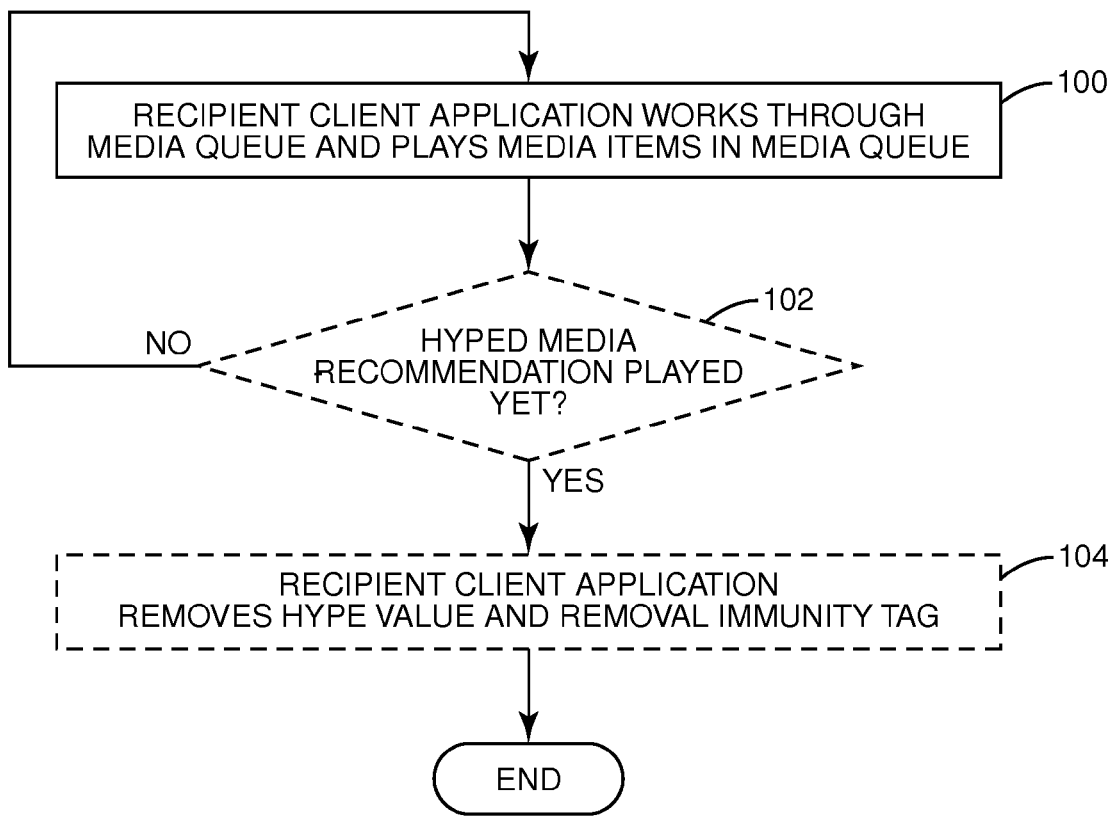
FIG. 8 illustrates an exemplary flowchart for optionally tracking a hyped media recommendation in the recipient's media queue and preventing removal before the hyped media is used or played, according to one embodiment of the present invention.

After the media recommendation is placed in the media queue 32, the recipient client application 30 works through the media items 56 in the media queue 32 and plays the media items 56 one by one, as illustrated in FIG. 8 (step 100). If the optional removal immunity tag was employed when the media recommendation was scored and placed into the media queue 32 (step 92 in FIG. 7), the client application 30 checks to see if media recommendations in the media queue 32 have been used or played (decision 102). This is because the removal immunity tag will be removed for a media recommendation once used or played (step 104). If not yet used or played, the recipient client application 30 continues to work through the media queue 32 playing the next media item 56.

Figure 9:
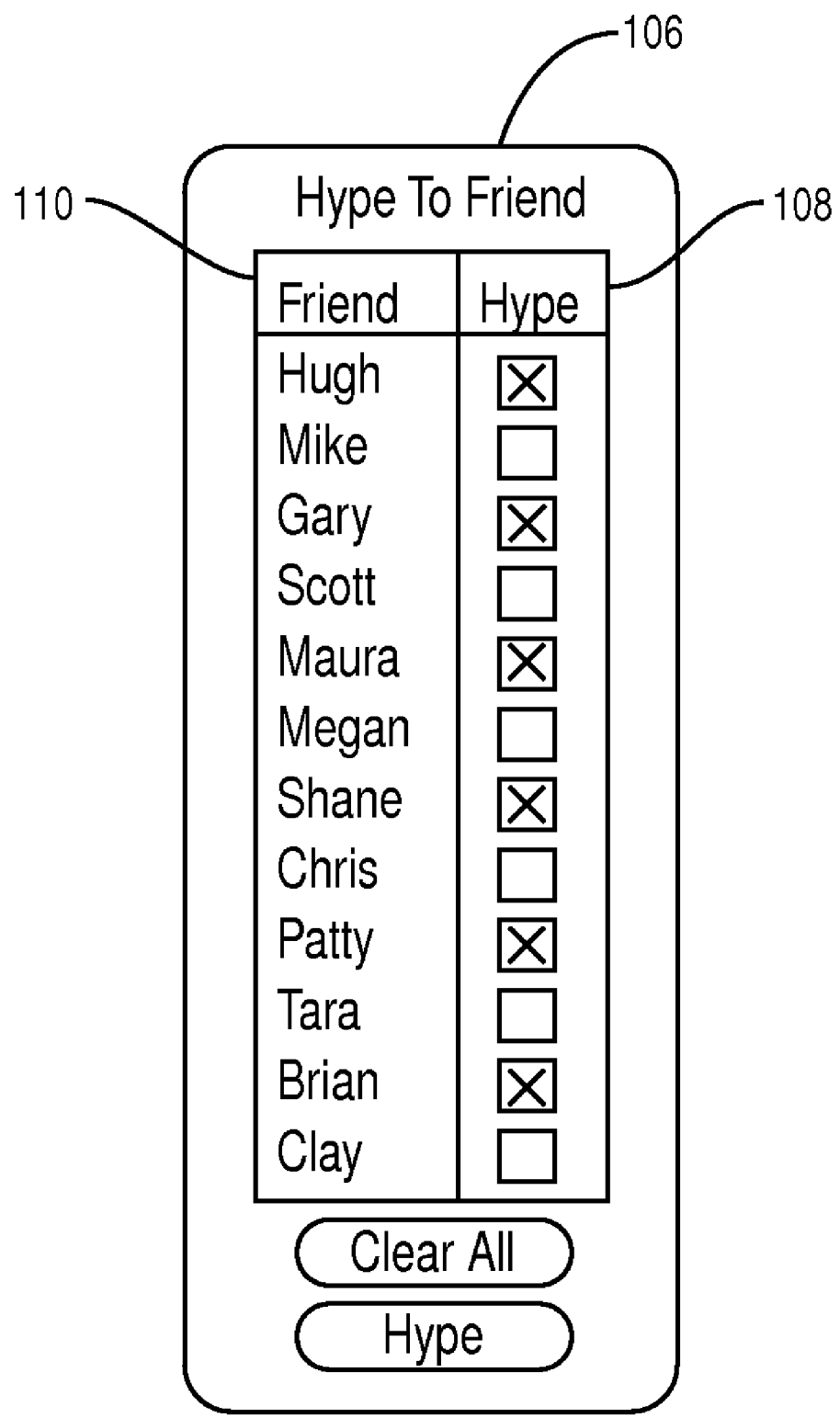
FIG. 9 illustrates an exemplary user interface for allowing a recommender to select recipients for receiving a hyped media recommendation, according to one embodiment of the present invention.

In another embodiment, the hype value for a media recommendation is determined using server-side calculations as opposed to being set by the recommender. A static hype value 74 may still be assigned. In this case, as illustrated in FIG. 9 by example, a hype interface 106 may be provided to the recommender to allow a media item 56 to be hyped. The hype interface 106 may be like the hype interface 70 previously described and illustrated in FIG. 6. However, because the central server 12 is setting the hype value as opposed to the recommender, a static hype field is not provided. Instead, only a hype designation check box 108 need be provided to allow a hype designation to be set since the recommender is not assigning the hype value. The recommender only needs to indicate which friends 110 to send the hyped media recommendation. If at least one hype designation check box 108 is selected, the selected media item 60 will be hyped and sent. If no hype designation check boxes 108 are selected, the selected media item 60 will not be hyped and sent. The client application 30 may select the hype designation check boxes 108 for each recipient friend 110 as a default setting for convenience purposes. The recommender can deselect the hype designation check boxes 108 for friends that are not to receive hyped media recommendations.

Figure 10:
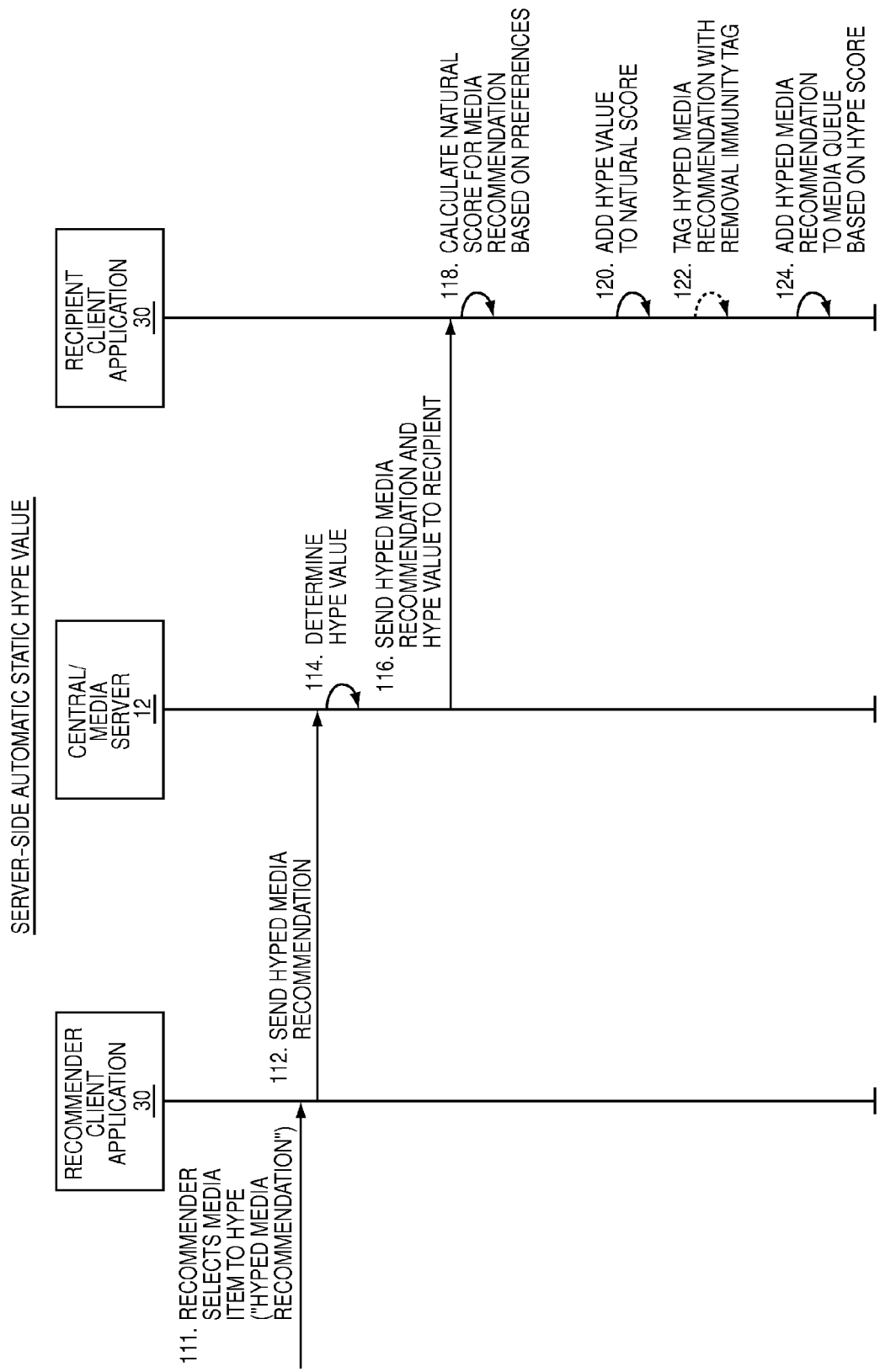
FIG. 10 illustrates an exemplary flow diagram for communications between devices in the media recommendation system for hyping a media recommendation and determining a hype score using a server-side designated static hype value and placing the hyped media recommendation in a peer recipient device's media queue as a function of the hype score, according to one embodiment of the present invention.

FIG. 10 illustrates a flow diagram illustrating exemplary communications between devices in the media recommendation system 10 for a server-side hype value calculation example. Once a recommender selects a media item to hype and a recipient to receive a hyped media recommendation (step 111), the hyped media recommendation is sent to the central server 12 (step 112). The central server 12 determines a hype value for the media recommendation as opposed to the hype value being assigned by the recommender (step 114).

Figure 11A:
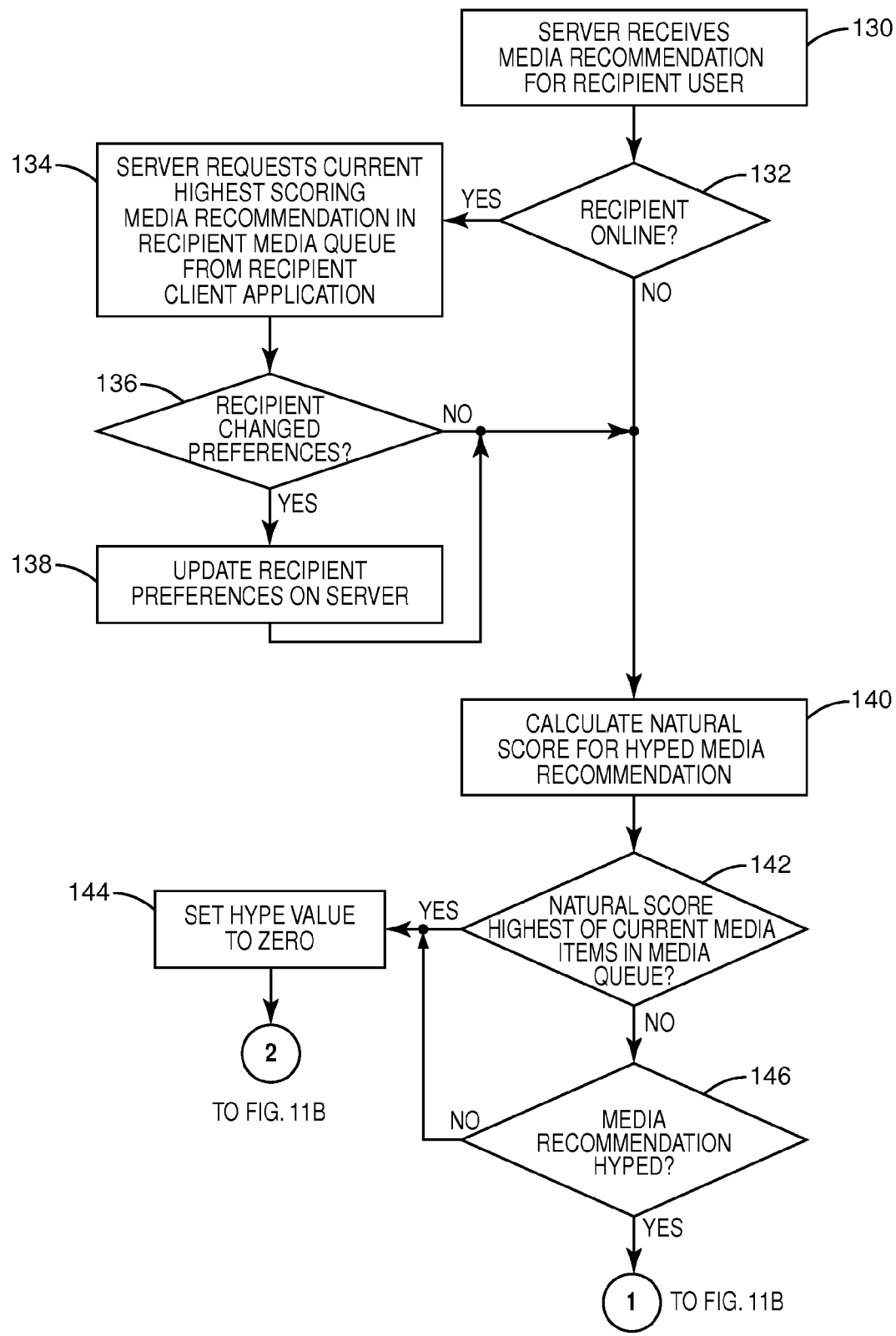
FIGS. 11A and 11B illustrate an exemplary flowchart for a server-side determination of a hype value for hyping a media recommendation and determining a hype score using a server-side designated static hype value and placing the hyped media recommendation in a peer recipient device's media queue as a function of the hype score, according to one embodiment of the present invention.
Figure 11B:
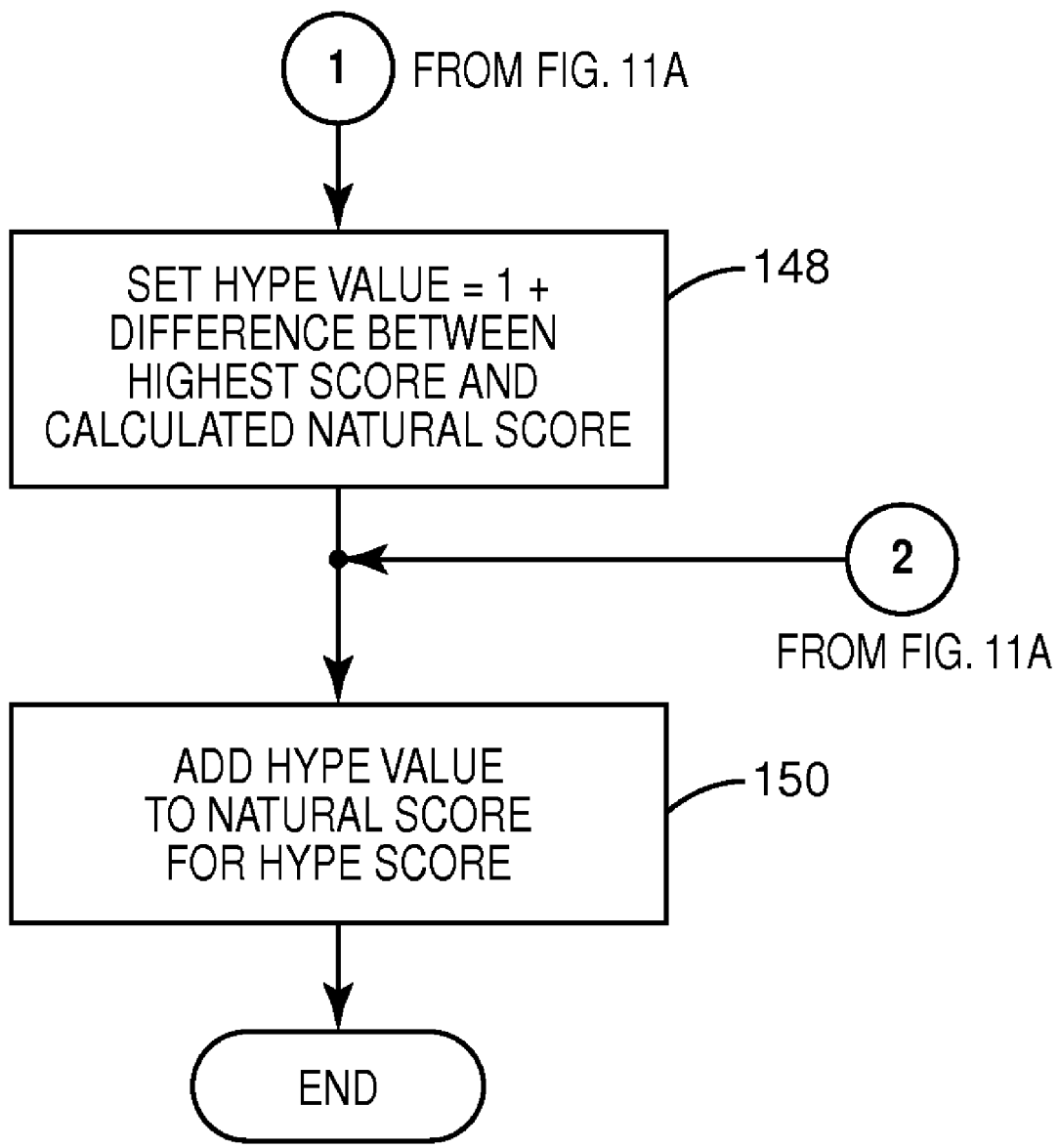

In one embodiment, the central server 12 determines the hype value by determining the natural score for the current most highly scored media recommendation in the recipient's media queue 32. The hype value is set to a static value that would result in a hype score sufficient to place the new media recommendation just above the current media recommendations in the media queue 32. The central server 12 has access to the recipient's media queue 32 via network 16 communications. Thus, newly incoming hyped media recommendations are scored higher than previously received media recommendations to provide first in, last out media queuing. FIGS. 11A and 11B are flowcharts illustrating an embodiment of a server-side hype value calculation. These flowcharts will now be described.

Turning to FIG. 11A, when the central server 12 receives the media recommendation from the recommender's peer device 14 (step 130), the central server 12 checks to determine if the recipient is online (decision 132). This means that the recipient's peer device 14 is currently connected to the media recommendation system 10 such that the central server 12 can communicate with the recipient's peer device 14 to obtain scoring information from the media queue 32. If online, the central server 12 requests the current highest scoring recommendation in the recipient peer device's media queue 32 (step 134). The central server 12 then determines if the recipient's preferences 34 have changed (decision 136). If so, the recipient's preferences 34 are updated on the central server 12 so that the central server 12 can accurately calculate the natural score for the media recommendation based on the recipient's preferences 34 (step 138). The central server 12 then calculates the natural score for the hyped media recommendation using the recipient's preferences 34 (step 140). This calculation may be performed like that previously discussed and illustrated in FIG. 2. If the natural score produces the highest score among the other media items 56 already in the recipient device's media queue 32 (decision 142), there is no need to hype the natural score. Thus, the hype value is set to zero so that the hype score will be set equal to the natural score (step 144). However, if the natural score is not the highest score among the other media items 56 already in the recipient device's media queue 32 (decision 142), a hype value will need to be calculated to be added to the natural score to provide the hype score.

The central server 12 next determines if the media recommendation is hyped (decision 146). If not, the hype value is also set to zero in this instance (step 144). This is because a hype value should not be applied if the received media recommendation is not hyped, as the central server 12 handles both hyped and non-hyped media recommendations. If the media recommendation is hyped and the natural score is not highest such that a hype value needs to be applied, the central server 12 calculates a hype value (step 148). The hype value is set such that when added to the natural score, the resulting hype score is 1 point higher than the score of the highest scored media item 56 in the media queue 32. In this manner, the incoming media recommendation will be placed higher in the media queue 32 than all other previously received media recommendations. Alternatively, the hype value could be provided by the central server 12 to result in the newly incoming hyped media recommendation being placed immediately behind previously received media recommendations. In either case, the hype value is then added to the natural score to arrive at the hype score (step 150). If the hype score was set to zero (step 144), the hype score will equal the natural score. If not, the hype score will score higher than the media item 56 in the media queue 32 with the highest score in this exemplary embodiment. Thus, media recommendations would be placed in the media queue 32 to be used or played on a first in, last out basis. In the alternative method, media recommendations would be placed in the media queue 32 to be used or played on a first in, first out basis.

Once the hype value is determined, the hyped media recommendation and server-side assigned hype value are sent to the recipient's peer device 14 (step 116). Although the central server 12 has previously determined the natural score for the media recommendation based on the recipient's preferences 34, the recipient client application 30 calculates the natural score again (step 118). This is so that the recipient peer device 14 is compatible with other hyping valuation methods, including those set by a recommender. Other methods may require that the recipient client application 30 calculate the natural score as part of calculating the hype score. The server-side hype value set by the central server 12 is added to the natural score (step 120).

Again as an option, the recipient client application 30 may tag the media recommendation with a removal immunity tag. This is so the recipient does not delete the media recommendation in the media queue 32 until the media recommendation is used or played (step 122). Thereafter, the hyped media recommendation is added to the media queue 32 based on the hype score (step 124). The hype score determines the order of placement of the media recommendation in the recipient's media queue 32. The recipient client application 30 then works through the media queue 32 to use or play the media items 56 in the media queue 32, including received media recommendations, like that described above and illustrated in FIG. 8.

Alternatively to the server-side hype value calculation, this same hype value calculation may be performed at the recipient's peer device 14. In this instance, the central server 12 would simply queue up received media recommendations to be delivered to a recipient peer device 14. When the recipient peer device 14 logs on to the media recommendation system 10, the central server 12 would send the hyped media recommendations queued up to the recipient peer device 14. The recipient peer device 14 could then perform the calculations like that described above and illustrated in the flowcharts of FIGS. 11A and 11B. That is to either provide a hype value that results in a score just above the score of the highest scored media recommendations in the media queue 32, or alternatively below the scores of the existing media recommendations.

Figure 12:
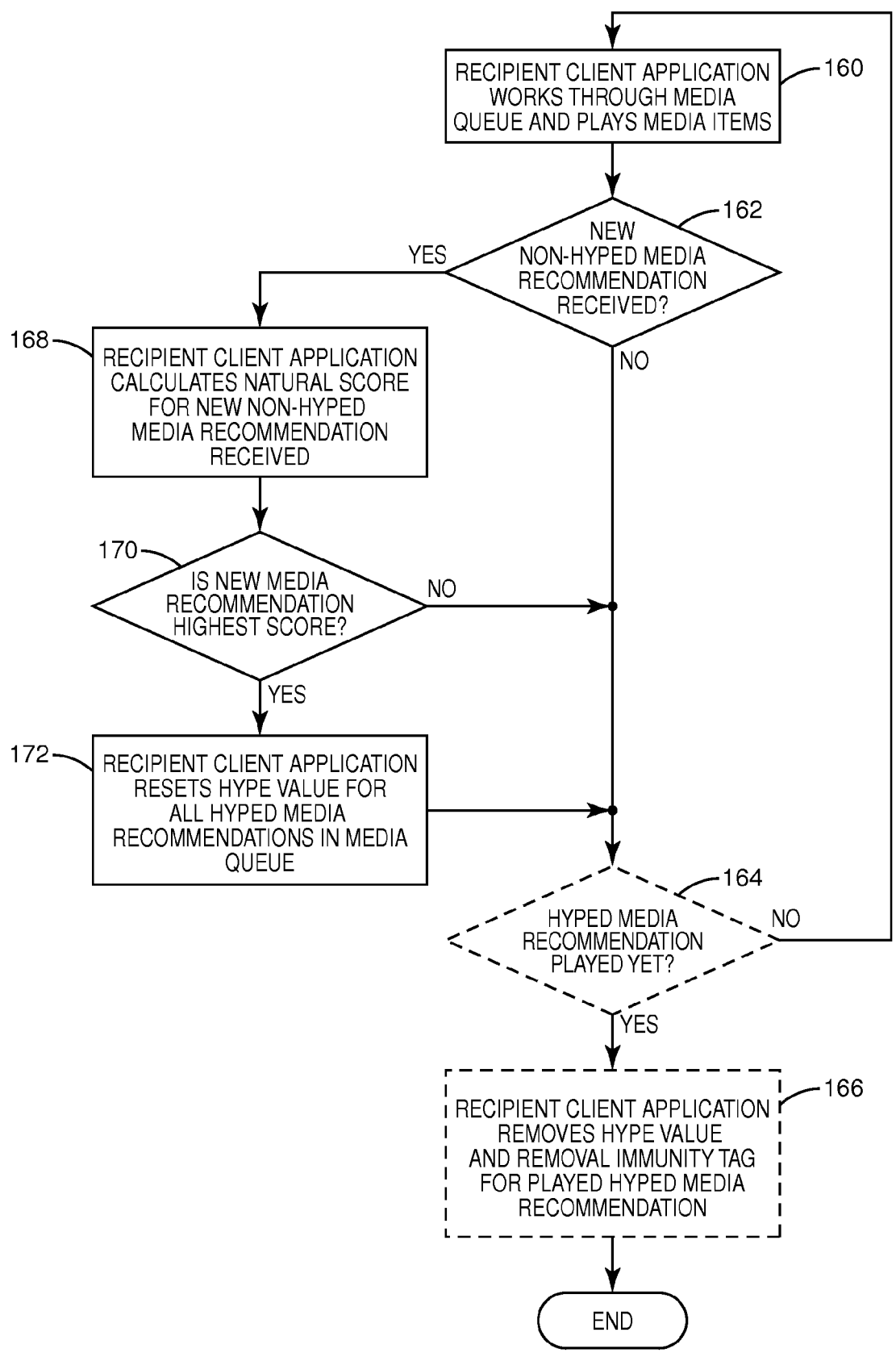
FIG. 12 illustrates an exemplary flowchart for hyping a media recommendation according to a hype score being a function of an automatic dynamically-updated hype value, according to one embodiment of the present invention.

The hype score calculation may be adapted such that the hype score is dynamically updated if the recipient changes their preferences 34 or new media items 56 are placed in the media queue 32. In the previous example, the central server 12 calculated a static hype value for the media recommendation. However, if the recipient's preferences 34 changed after the static hype value was calculated, but before the hype score was determined, the static hype value may not properly score the media recommendation. For example, the recipient's preferences 34 may have changed such that the non-recommended media items in the media queue 32 are scored differently. Thus, the hype score for media recommendations in the media queue 32 may need to be updated. For example, a media recommendation may have scored "68" when the next highest media recommendation scored "67." However, if a new non-recommended media item scores "74", such as a result of changed recipient preferences 34 or new media items 56 being added to the media queue 32, the media recommendation scores are no longer highest. Thus, the recipient client application 30 can be adapted to calculate and dynamically update the hype value calculation for media recommendations anytime the recipient's preferences 34 change or new media items 56 are added to the media queue 32. FIG. 12 is a flowchart providing an example of an automatic and dynamically calculated hype value for media recommendations.

As illustrated in FIG. 12, the recipient client application 30 works through the media queue 32 to use and/or plays media items in the media queue 32 (step 160). As long as new non-hyped media recommendations are not received (decision 162), the process continues with the optional steps of determining and removing immunity tags from used or played media recommendations (steps 164, 166), just as previously described and illustrated in FIG. 8 (steps 102, 104). If, however, a new non-hyped media recommendation is received (decision 162), the recipient client application 30 calculates the natural score for the non-hyped media recommendation (step 168). If the score for the non-hyped media recommendation is higher than any of the hyped media recommendations (decision 170), the recipient client application 30 resets the hype values for all the hyped media recommendations in the media queue 32 (step 172). This is because the non-hyped media recommendation scored higher than hyped media recommendations, which if allowed, would defeat the purpose of hyping. The hyped media recommendations are again placed highest in the media queue 32 automatically and in a dynamically-updated fashion.

Figure 13:
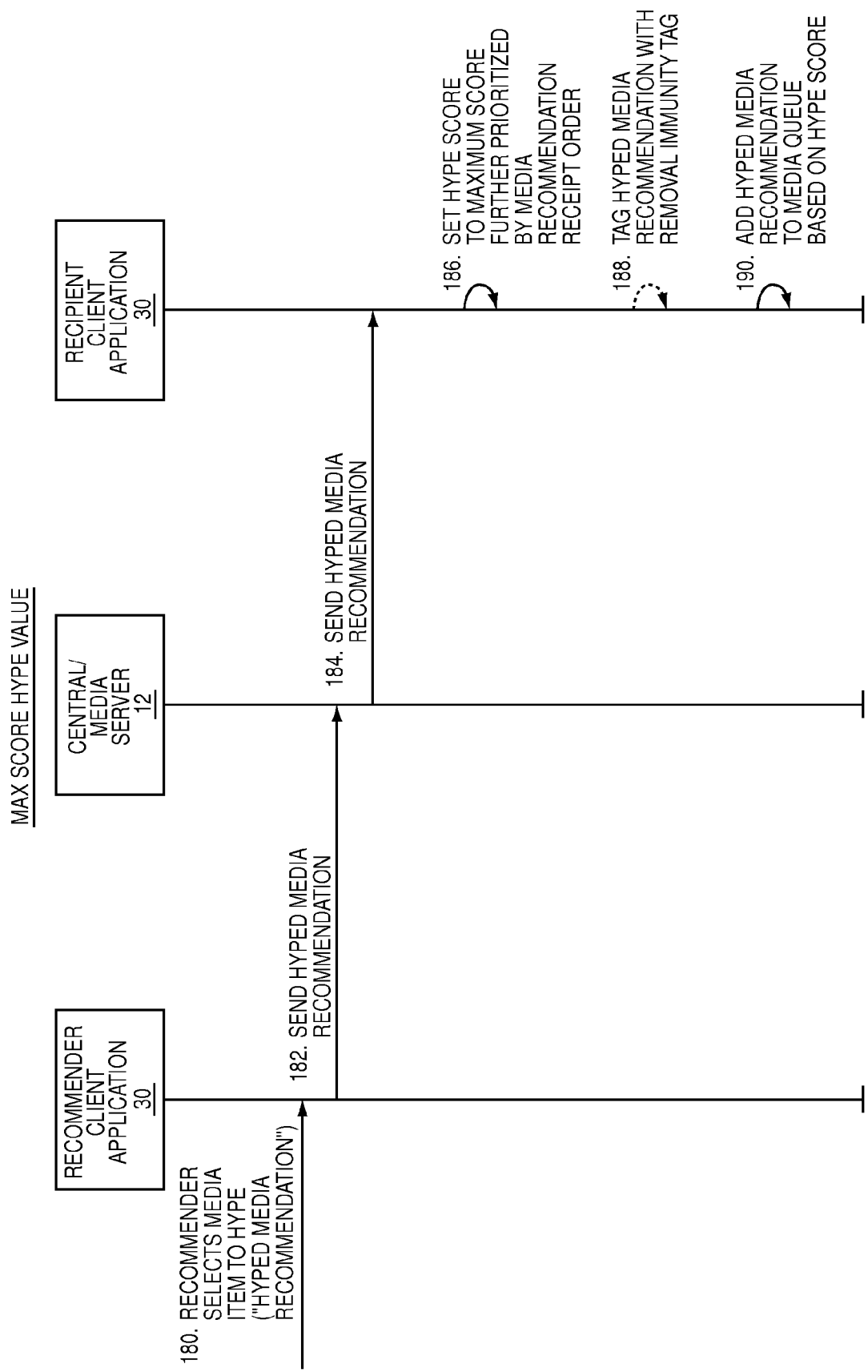
FIG. 13 illustrates an exemplary flow diagram for communications between devices in the media recommendation system for hyping a media recommendation with a hype score that is the maximum score in the recipient's media queue and placing the hyped media recommendation in the media queue according to the maximum score, according to one embodiment of the present invention.

The recipient client application 30 may also be adapted to simply set hyped media recommendations to a maximum score in the media queue 32. In this manner, dynamic updating of the hype value and scores of hyped media recommendations is not required, because the hyped media recommendations already have the maximum score. FIG. 13 illustrates an exemplary flow diagram for communications between devices in the media recommendation system 10 for hyping a media recommendation with a maximum score in the recipient's media queue 32. The steps for the recommender to hype a media item 56 and send it to the recipient are similar to those previously described (steps 180-186). However, when the hyped media recommendation is received by the recipient's peer device 14, the hype score is set to the maximum score for the media queue 32. Multiple hyped media recommendations all receiving the maximum score may be further ordered based on time of receipt or other method. The process continues with the optional steps of adding a removal immunity tag to the media recommendation (step 188), and adding the hyped media recommendation to the media queue 32 based on the hype score (step 190).

As discussed above, hyped media recommendations may be sent by a recommender peer device 14 to a recipient peer device 14 to increase order of placement in the recipient's media queue 32. The recipient peer device 14 may calculate the hype score for hyped media recommendations. However, the recipient may not have control over the scoring of hyped media recommendations in their media queue 32. A disingenuous recommender could hype all its media recommendations. This may result in the recipient's media queue 32 being stocked with a particular recommender's media recommendations. This may defeat the benefit of a recommendation system providing recommendations from a variety of recommenders. Thus, the present invention may include additional controls in the recipient client application 30 that allow a recipient to maintain a level of control over his or her media queue 32 for hyped recommendations. Without this control, a recommender may be in a position to unduly control the recipient's media queue 32 via hyping.

Figure 14:
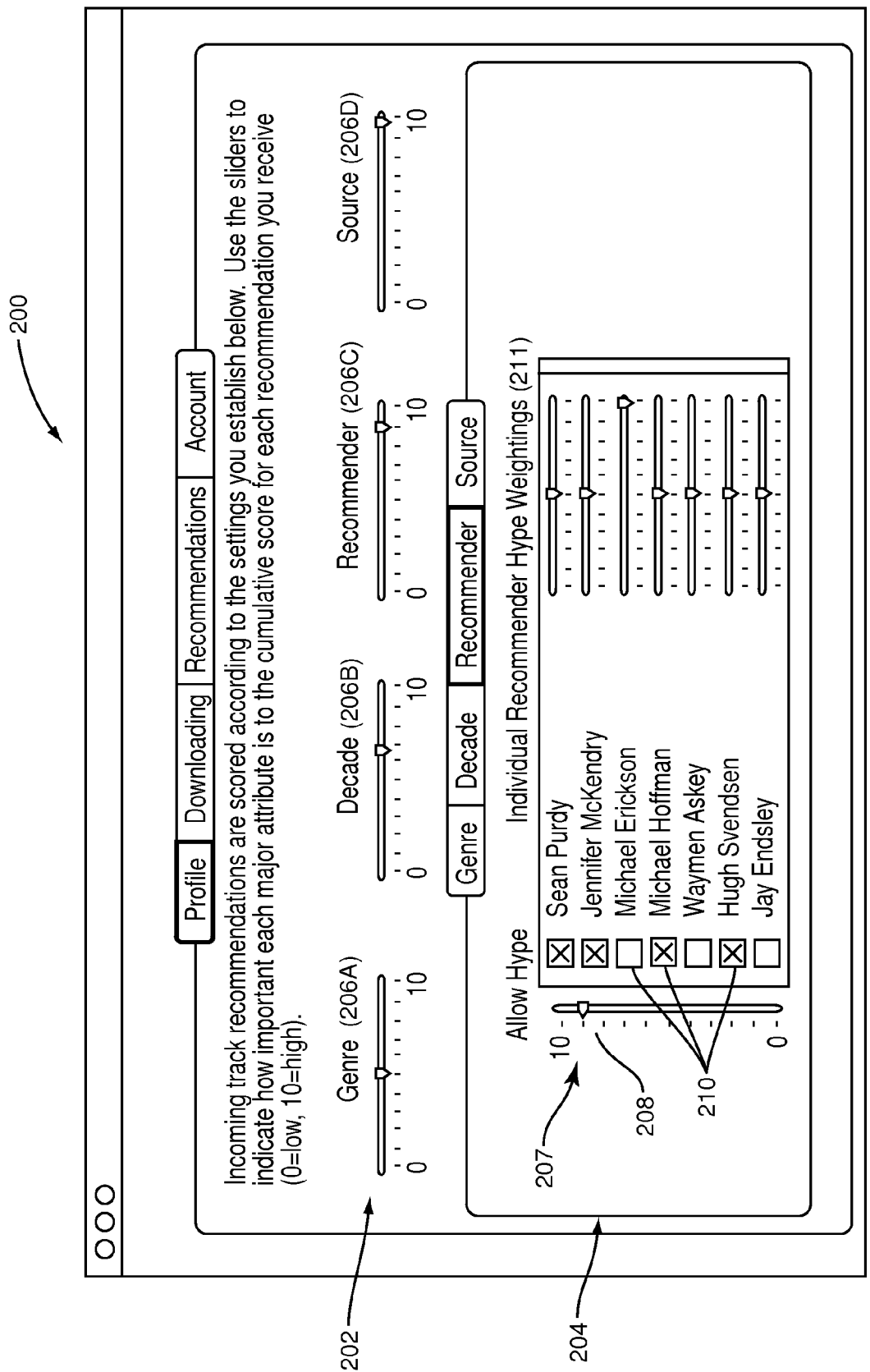
FIG. 14 illustrates an exemplary recipient hyping preference interface for allowing a recipient to control the hype score calculated for received hyped media recommendations, according to one embodiment of the present invention.

In this regard, the present invention can include a recipient preferences interface 200 that executes on the recipient's peer device 14, as illustrated in FIG. 14. The recipient preferences interface 200 allows the recipient to control preferences used to score received media items, including media recommendations. The recipient preferences interface 200 in the example of FIG. 14 consists of a general recommendation preference interface 202 and a hyping preference interface 204. The general recommendation preference interface 202 allows the recipient to establish preferences used to provide a natural score for media recommendations. In this regard, sliders 206 may be provided to allow the recipient to establish scoring preferences based on weighting of media attributes. These media attribute weightings were previously described and illustrated in FIG. 2 and were used to naturally score the 1999 soundtrack media recommendation previously described as "67."

The hyping preference interface 204 allows the recipient to control hyped media recommendations by establishing hyping preferences. Without this control, the recommender may be in a position to unduly control the recipient's media queue 32 via disingenuous hyping of media recommendations. The hyping preference interface 204 includes a master hype weight 207 controlled by a master hype weight slider 208 to control the master hype weight 207 assigned to incoming hyped media recommendations. In the example illustrated in FIG. 12, the master hype weight 207 is "9." The recipient can also control whether hyped media recommendations are allowed from a particular recommender on an individualized basis by either selecting or deselecting the "Allow Hype" check box 210 beside each recommender's name in the individual recommender hype weightings 211. For example, recommender "Sean" is allowed to hype media recommendations to the recipient. If a recipient is not allowed to hype media recommendations to the recipient, a hyped media recommendation from the disallowed recommender is still received. It is just not hyped, meaning that it is scored with a natural score based on the recipient's preferences 34. No hype value is added. However, if a recipient is allowed to hype media recommendations to the recipient, a hype score will be calculated, which is a function of a calculated hype value. In this example, the hype value is added to the natural score to arrive at a hype score.

If hyped media recommendations are allowed for a recommender, the hyping preference interface 204 controls the hype value calculated for the incoming hyped media recommendation. The hype value is controlled by the master hype weight 207 and the individual recommender hype weightings 211. The hyping preference interface 204 allows the recipient to control the hype weighting of each recommender individually. A default setting may be provided to allow hyping for each recommender in the recipient's social network and for their individual recommender hype weightings to be set at a middle range, for example "5" out of a possible "10." The hype value is a product of the master hype weight 207 and an individual recommender hype weighting 211 in the example of FIG. 14.

Continuing with the earlier example in FIG. 2 of an incoming media recommendation from user "Sean" that is a "Buy/Download" track with the genre "Soundtrack" and a release date of 1999, if this media recommendation was hyped, a hype score would be calculated. In this example, the hype score would be "79" as opposed to the natural score of "67", as follows:

Hype Score=(1/10)*(1/(WD+WG+WS))*(WD*WDA+ WG*WGA+WS*WSA+WR*WRA+WH*WHA) *100

Hype Score=(1/10)*(1/(7+9+10+9))*(7*8+9*8+ 10*6+9*5+9*5)*100

Hype Score=(1/10)*(1/35)*(56+72+60+45+45)*100

Hype Score=(1/10)*(1/35)*(278)*100

Hype Score=79

An alternative hype score may be as follows:

Hype Score=(1/10)*(1/(*WD*+*WG*+*WS*+*WR*+*WH*))* (*WD*\*WDA+*WG*\*WGA+*WS*\*WSA+*WR*\*WRA+ *WH*\*WHA)*100

Hype Score=(1/10)*(1/(7+9+10+9+9))*(7*8+9*8+ 10*6+9*5+9*5)*100

Hype Score=(1/10)*(1/44)*(56+72+60+45+45)*100

Hype Score=(1/10)*(1/44)*(278)*100

Hype Score=63

As shown above, the hype score is a function of the natural score based on weighting of the media attributes for the media recommendation as well as a hyping value. The effect of the hype value is shown in bolded text in the above example. The hype value is calculated as a function of the master hype weight of "9" times "Sean's" recommender hype weight of "5." In the first example, the hype score of "79" is higher than the natural score of "67." Thus, the hyped media recommendation may be placed higher in the recipient peer device's media queue 32 than would otherwise be performed had only the natural score been used. In the alternative example, the hype value is also calculated as part of the hype score. However, the hype value is weighted against the other non-hyping recommendation weightings resulting in a lower score than the natural score would otherwise be. This control allows the recipient to still allow hyping from a particular recommender, but to control the hype score for hyped media recommendations In summary for this example, the recipient can control the effect of hyping for all hyped media recommendations by controlling the master hype weight 207 via the master hype weight slider 208. If no hyping is desired to be allowed from any recommender, the recipient can set the master hype weight 207 to zero. If hyping is allowed, but the recipient wants to disallow hyping from an individual recommender (e.g. Sean), the recipient can deselect the "Allow Hype" check box 210 beside the individual recommender's name in the individual recommender hype weightings 211. If hyped recommendations are allowed for an individual recommender, but the recipient desires to control the amount of hyping for the individual recommender, the recipient can set the individual recommender hype weightings 211 to the desired settings.

Figure 15:
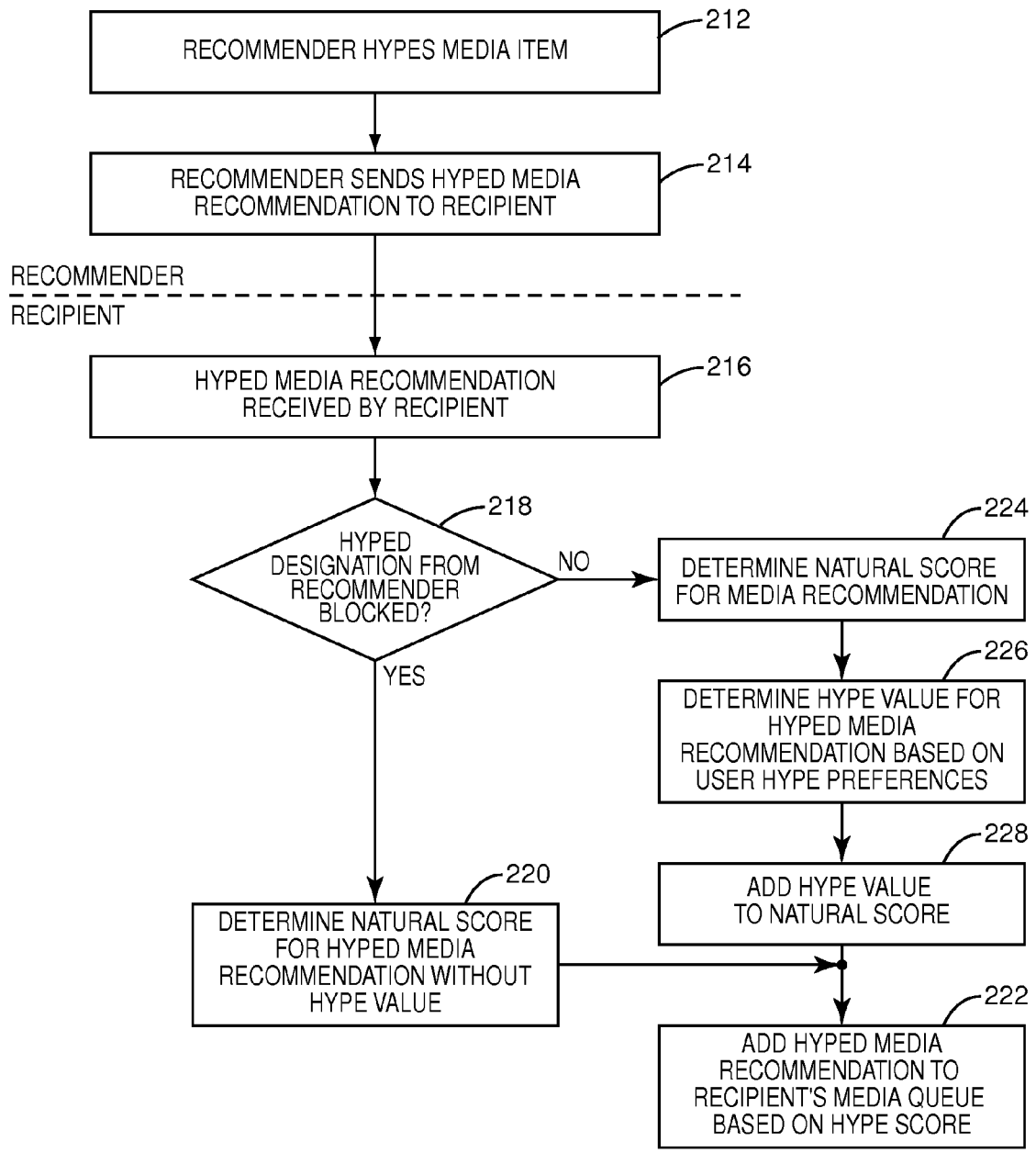
FIG. 15 illustrates an exemplary flowchart for a recipient-side determination of a hype score for a hyped media recommendation according to the recipient's preferences, and prioritizing the hyped media recommendation in the recipient device's media queue as a function of the hype value, according to one embodiment of the present invention.

FIG. 15 is a flowchart continuing with the example of FIG. 14 for determining a hype score for a media recommendation using the recipient's preferences 34. The hype value is determined based on hyping preferences established by the recipient in the hyping preference interface 204 on the recipient peer device 14 in this example. The hyping preferences establish preferences for handling and control of hyping for hyped media recommendations. The process starts by the recommender hyping a media recommendation as previously described (step 212). The recommender then sends the hyped media recommendation to the recipient's peer device 14 (step 214). The recipient client application 30 receives the hyped media recommendation (step 216). The recipient client application 30 checks the "Allow Hype" check box 210 to determine if hyping is blocked for the recommender (decision 218). If so, a natural score is calculated for the media recommendation without the influence of hyping (step 220). The hyped media recommendation is then added to the recipient's media queue 32 based on the hype score (step 222).

If however, hyping is not blocked for the recommender (decision 218), a hype score will be determined. The hype score is determined as a function of the natural score (step 224) and a hype value determined for the media recommendation (step 226). The hype value is then added or factored in to the natural score (step 228). In the example of FIG. 14, the hype value is based on a master hype weight 207 as well as an individual recommender hype weightings 211. Thus, the hype value is added to the natural score in a weighted calculation.

The present invention can involve any one of the aforementioned embodiments, or a combination thereof. For example, the present invention may involve both the ability of a recommender or server to influence the hype value and the ability of the recipient to subsequently determine acceptance, or further control or influence the hype value to arrive at the hype score. Allowing a recipient to determine acceptance, or further control or influence the hyping value may be useful to allow the recipient to maintain a level of control of their media queue 32 without completely disallowing hyping. The subsequent acceptance or further control or influence may be based on hyping preferences established by the recipient similar to those previously described.

In a first example, a recommender may hype a media recommendation and provide a static hype value, for example "+20." A hyping preference may be available to the recipient to ignore hyping if the recommended media is not of a particular type or attribute matching a preference set by the recipient for the recommender. This hyping preference can be set based on an individual recommender, a group of recommenders, or all recommenders. For example, the recipient may only allow hyping of media recommendations from a particular recommender if the media has a "Country" genre.

In another example, a hyping preference may be available to allow the recipient to alter the recommender's static hype value based on a static value or percentage calculation. This can include either reducing or increasing the static hype value by the static value or percentage. The hyping alteration preference can be set based on an individual recommender, a group of recommenders, or all recommenders. For example, if a recommender designates a static hype value of "20" for a hyped media recommendation, the recipient may reduce the hype value by five percent, which would result in a hype value of "19" instead of "20."

As another example, a hyping preference may be available to allow the recipient to subordinate the hype value to a score threshold. In other words, the recipient allows hyping from the recommender provided that the recipient's media queue 32 is not already populated with media having a score above a given threshold score. The hyping threshold preference can be set based on an individual recommender, a group of recommenders, or all recommenders. For example, if a recipient's media queue 32 does not contain media having a score above "80," hyping may be allowed. Otherwise, the hyping for a hyped media recommendation is ignored. This allows the recipient to control whether or not their media queue 32 is unduly influenced by a recommender. Further, the threshold preference could be designed such that hyping is allowed and applied for the previously sent media recommendation once the recipient has used or played the media items in their media queue that scored above the threshold score.

As yet another example, a hyping preference may be available to allow the recipient to control the maximum number of hyped media recommendations allowed in his or her media queue 32 at any given time. This maximum number could be a static amount (e.g. 10), an amount within a given time period (e.g. 10 per hour), or an amount per session or login period (e.g. 10), as examples. This maximum number of allowed hyped media recommendations can be set based on an individual recommender, a group of recommenders, or all recommenders. For example, if a recipient's media queue 32 already contains ten hyped media recommendations, hyping is not allowed for an eleventh received hyped media recommendation if the maximum number is set to a preference of ten. If a recipient's media queue 32 does not contain ten hyped media recommendations, hyping would be allowed for the newly incoming hyped media recommendation in this example.

Those skilled in the art will recognize improvements and modifications to the preferred embodiments of the present invention. All such improvements and modifications are considered within the scope of the concepts disclosed herein and the claims that follow.

What is claimed is:

1. A method of prioritizing a media recommendation in a media recommendation system, comprising the steps of:
   receiving a hyped media recommendation from a recommender;
   determining a hype score for the hyped media recommendation; and
   effecting adding the hyped media recommendation to a media queue based on the hype score.

2. The method of claim 1, wherein the effecting adding the hyped media recommendation to a media queue based on the hype score comprises:
   determining an order of placement in the media queue for the hyped media recommendation based on the hype score; and
   effecting adding the hyped media recommendation in the determined order of placement in the media queue.

3. The method of claim 2, further comprising tagging the hyped media recommendation with a removal immunity tag so that the hyped media recommendation cannot be deleted from the media queue until used or played.

4. The method of claim 1, wherein the determining a hype score for the hyped media recommendation comprises:
   determining a hype value for the hyped media recommendation, wherein the hype value represents an amount of hyping to be applied to the hyped media recommendation; and
   determining the hype score for the hyped media recommendation as a function of the hype value.

5. The method of claim 4, wherein the determining a hype value for the hyped media recommendation comprises determining a hype value for the hyped media recommendation based on a hyping preference established by a recipient, wherein the hype value represents an amount of hyping to be applied to the hyped media recommendation.

6. The method of claim 5, wherein the hyping preference comprises a master hype weight applied to the hyped media recommendation regardless of an identity of the recommender.

7. The method of claim 5, wherein the hyping preference comprises an individual recommender hype weighting applied to the hyped media recommendations based on an identity of the recommender.

8. The method of claim 7, wherein the hyping preference comprises hyping preferences, wherein the hyping preferences comprises a master hype weight applied to the hyped media recommendation regardless of the identity of the recommender and the individual recommender hype weighting.

9. The method of claim 4, further comprising determining a natural score for the hyped media recommendation as if the hyped media recommendation were not hyped,
wherein the determining the hype score for the hyped media recommendation as a function of the hype value comprises determining the hype score for the hyped media recommendation as a function of the hype value and the natural score.

10. The method of claim 9, wherein the determining the natural score further comprises determining the natural score based on recommendation preferences established by the recipient.

11. The method of claim 10, further comprising updating the hype score for the hyped media recommendation in the media queue if either the recommendation preferences are altered or a new media recommendation is received having a score higher than the hype score of hyped media recommendation.

12. The method of claim 1, wherein the hype value is a value comprised from a group consisting of a static hype value, a recommender set hype value, a recommender set static hype value, a server-side hype value, a server-side static hype value, a recommender set hype value, a recommender set static hype value, and a value to provide a hype score greater than non-hyped media recommendations in the media queue.

13. The method of claim 1, wherein the hype score is a score comprised from the group consisting of a media queue maximum score, the hype value added to a natural score for the hyped media recommendation, and a score of one plus the score of a highest scoring media item in the media queue.

14. The method of claim 1, wherein the determining a hype score for the hyped media recommendation comprises determining a hype value for the hyped media recommendation based on recipient preferences established by a recipient.

15. A method of prioritizing a media recommendation in a media recommendation system, comprising the steps of:
receiving a hyped media recommendation from a recommender;
determining if hyping is allowed for the hyped media recommendation; and
if hyping is allowed for the hyped media recommendation:
determining a hype score for the hyped media recommendation; and
effecting adding the hyped media recommendation to a recipient's media queue based on the hype score.

16. The method of claim 15, wherein if hyping is not allowed:
determining a natural score for the hyped media recommendation as if the hyped media recommendation were not hyped; and
effecting adding the hyped media recommendation to the recipient's media queue based on the natural score.

17. The method of claim 15, wherein the determining if hyping is allowed for the hyped media recommendation comprises determining if hyping is allowed for the hyped media recommendation based on hyping preferences established by the recipient.

18. The method of claim 15, wherein the determining if hyping is allowed for the hyped media recommendation comprises determining if hyping is allowed for the hyped media recommendation based on an identity of the recommender.

19. A device for facilitating prioritizing of a media recommendation in a media recommendation system, comprising:
a recommender device in a media recommendation system, wherein the recommender device is adapted to:
receive a selection to provide a hyped media recommendation to a recipient; and
send the hyped media recommendation destined for the recipient to effect adding the hyped media recommendation to a media queue based on a hype score.

20. The device of claim 19, wherein the receipt of a selection to hype a media item for a recipient is comprised of receipt of a selection to hype a media item for either an individual recommendation friend, a group of recommendation friends, or all recommendation friends.

21. The device of claim 19, wherein the recommender device is further adapted to:
determine a hype value for the hyped media recommendation, wherein the hype value is the amount of hyping to be applied to the hyped media recommendation; and
send the hype value destined for the recipient wherein the hype score is a function of the hype value.

22. A device for facilitating prioritizing of a media recommendation in a media recommendation system, comprising:
a server in a media recommendation system, wherein the server is adapted to:
receive a hyped media recommendation from a recommender;
determine a hype score for the hyped media recommendation; and
send the hyped media recommendation and the hype score to a recipient to effect the recipient adding the hyped media recommendation to a media queue based on the hype score.

23. The device of claim 22, wherein the server is further adapted to:
determine an order of placement in the media queue for the hyped media recommendation based on the hype score; and
effect adding the hyped media recommendation in the determined order of placement in the media queue.

24. A computer-readable medium for prioritizing a media recommendation in a media recommendation system, comprising instructions for instructing a computer to:
receive a hyped media recommendation from a recommender;
determine a hype score for the hyped media recommendation; and
effect adding the hyped media recommendation to a media queue based on the hype score.

25. The computer-readable medium of claim 24, further comprising instructions for instructing the computer to determine an order of placement in the media queue for the hyped media recommendation based on the hype score,
wherein the effect adding the hyped media recommendation to a media queue based on the hype score comprises effect adding the hyped media recommendation in the determined order of placement in the media queue.

* * * * *